United States Patent
Rofougaran et al.

(10) Patent No.: US 12,557,049 B1
(45) Date of Patent: Feb. 17, 2026

(54) TIME DIVISION DUPLEXING SYNCHRONIZATION IN WIRELESS MESH NETWORKS

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Coast, CA (US); Milan Rofougaran, Newport Coast, CA (US); Kavian Odabaee, Newport Coast, CA (US)

(73) Assignee: PELTBEAM INC., Sherman Oaks, CA (US)

( * ) Notice: Subject to any disclaimer, the term of this patent is extended or adjusted under 35 U.S.C. 154(b) by 0 days.

(21) Appl. No.: 19/329,613

(22) Filed: Sep. 16, 2025

(51) Int. Cl.
*H04W 56/00* (2009.01)
*H04L 5/14* (2006.01)
*H04W 84/12* (2009.01)
*H04W 88/04* (2009.01)

(52) U.S. Cl.
CPC .......... *H04W 56/0015* (2013.01); *H04L 5/14* (2013.01); *H04W 84/12* (2013.01); *H04W 88/04* (2013.01)

(58) Field of Classification Search
CPC . H04W 56/0015; H04W 84/12; H04W 88/04; H04L 5/14
See application file for complete search history.

(56) References Cited

U.S. PATENT DOCUMENTS

| | | | |
|---|---|---|---|
| 2009/0219839 A1* | 9/2009 | Zhao | H04W 74/02 370/280 |
| 2009/0252134 A1* | 10/2009 | Schlicht | H04L 1/0015 709/205 |
| 2010/0142447 A1* | 6/2010 | Schlicht | H04W 4/20 370/328 |
| 2012/0257585 A1* | 10/2012 | Sydor | H04W 72/541 370/329 |
| 2014/0269633 A1* | 9/2014 | Behnamfar | H04L 5/0073 370/336 |
| 2020/0313753 A1* | 10/2020 | Schwartz | H04L 5/14 |
| 2021/0058826 A1* | 2/2021 | Mao | H04W 28/0933 |
| 2021/0067237 A1* | 3/2021 | Sampath | H04W 74/0833 |

(Continued)

*Primary Examiner* — Ajay Cattungal
(74) *Attorney, Agent, or Firm* — CHIP LAW GROUP

(57) ABSTRACT

A system for enhanced time division duplexing (TDD) synchronization in a wireless mesh network includes a master access point device and a plurality of repeater devices. The master access point device propagates a first extended wireless local area network (WLAN) beacon to plurality of repeater devices in a specific order based on network topology mapping information. The first extended WLAN beacon includes a first synchronization pattern. A first repeater device receives the first extended WLAN beacon and compares the first synchronization pattern with a prestored synchronization pattern. The first repeater device iteratively adjusts the timing of a local oscillator based on signal strength or signal-to-noise ratio measurements until the patterns match with the prestored synchronization pattern. The first repeater device locks TDD signal timing at the first repeater device based on the first synchronization pattern that matches with the prestored synchronization pattern.

20 Claims, 10 Drawing Sheets

(56) References Cited

U.S. PATENT DOCUMENTS

| | | | |
|---|---|---|---|
| 2023/0115394 A1* | 4/2023 | Abedini | H04W 48/12 |
| | | | 370/503 |
| 2025/0048122 A1* | 2/2025 | Takahashi | H04B 7/155 |
| 2025/0048123 A1* | 2/2025 | Takahashi | H04B 7/155 |
| 2025/0133416 A1* | 4/2025 | Kumagai | H04W 24/10 |

* cited by examiner

TIME DIVISION DUPLEXING SYNCHRONIZATION IN WIRELESS MESH NETWORKS

CROSS-REFERENCE TO RELATED APPLICATIONS/INCORPORATION BY REFERENCE

None

FIELD OF TECHNOLOGY

Certain embodiments of the disclosure relate to a wireless communication system. More specifically, certain embodiments of the disclosure relate to a system and a method for an enhanced time division duplexing (TDD) synchronization in a wireless mesh network.

BACKGROUND

Conventional communication devices, such as wireless access points (WAPs), are often used to extend the wireless coverage of an existing Wi-Fi signal to access the internet and to increase the number of end-user devices capable of using Wi-Fi®. However, Wi-Fi® signals, under the limitation of the Wi-Fi® communication protocol, have a defined range beyond which the connectivity is lost. Thus, many WAPs or range extenders are used if wireless coverage for Wi-Fi® signals is to be extended. Moreover, under ideal conditions, typically, 2.4 GHz Wi-Fi® supports up to 450 Mbps or 600 Mbps, and 5 GHz Wi-Fi® supports up to 1300 Mbps. Thus, the data transmission over such narrow bandwidth is much lower than higher radio frequencies. Additionally, in mesh network configurations with multiple repeater devices, maintaining precise timing synchronization becomes increasingly challenging, leading to interference and reduced network efficiency.

Currently, wireless mesh networks are increasingly used in a variety of applications ranging from enterprise Wi-Fi deployments to private 5G systems in industrial, enterprise, and home settings to handle bandwidth issues and extend range of wireless coverage. A common technique employed in such networks is Time Division Duplexing (TDD), wherein uplink and downlink transmissions share the same frequency but operate in different time slots. In conventional implementations, however, TDD synchronization among mesh nodes is often imprecise or completely absent, particularly in networks that lack centralized timing sources or are deployed in dynamic environments. The lack of synchronization may result in several performance issues. Notably, uplink and downlink collisions may occur between neighboring network nodes, which leads to packet loss, increased latency, and reduced throughput. The uplink and downlink collisions issue becomes especially severe in dense mesh deployments or when low-latency or high-throughput applications are in use. Some mesh systems attempt to address the uplink and downlink collisions issue using GPS-based synchronization, which provides accurate timing to some extent but suffers from significant limitations, particularly in indoor or obstructed environments where GPS signals are unreliable or unavailable. Moreover, GPS receivers add hardware cost and power consumption, making them unsuitable for low-cost or power-constrained mesh devices.

Furthermore, other techniques, such as the IEEE 1588 Precision Time Protocol (PTP), offer certain level of precision over wired networks but are sensitive to jitter and may not perform reliably over wireless backhaul links, especially under high interference or multipath conditions. Further, most consumer-grade Wi-Fi® hardware does not support hardware timestamping, which is a requirement for high-precision PTP. Additionally, software-level timestamping introduces jitters, reducing accuracy to millisecond levels (instead of microseconds), which may not be desirable. Mesh topologies introduce multiple hops, each adding jitter and uncertainty in timestamp accuracy. Wi-Fi® systems are contention-based (CSMA/CA), not deterministic like Ethernet that is suited for PTP. Additionally, reference broadcast synchronization (RBS) and similar methods used in consumer mesh products offer low-cost alternatives but often lack the temporal precision required to maintain strict TDD slot alignment, especially in dynamically changing topologies or industrial deployments. RBS methods, while low-cost and easy to implement, typically provide insufficient precision and unreliable performance in dynamic, real-world mesh networks, especially in a mesh network environment.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A system and a method for time division duplexing (TDD) synchronization in a wireless mesh network, for enhanced mesh network coordination and performance, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
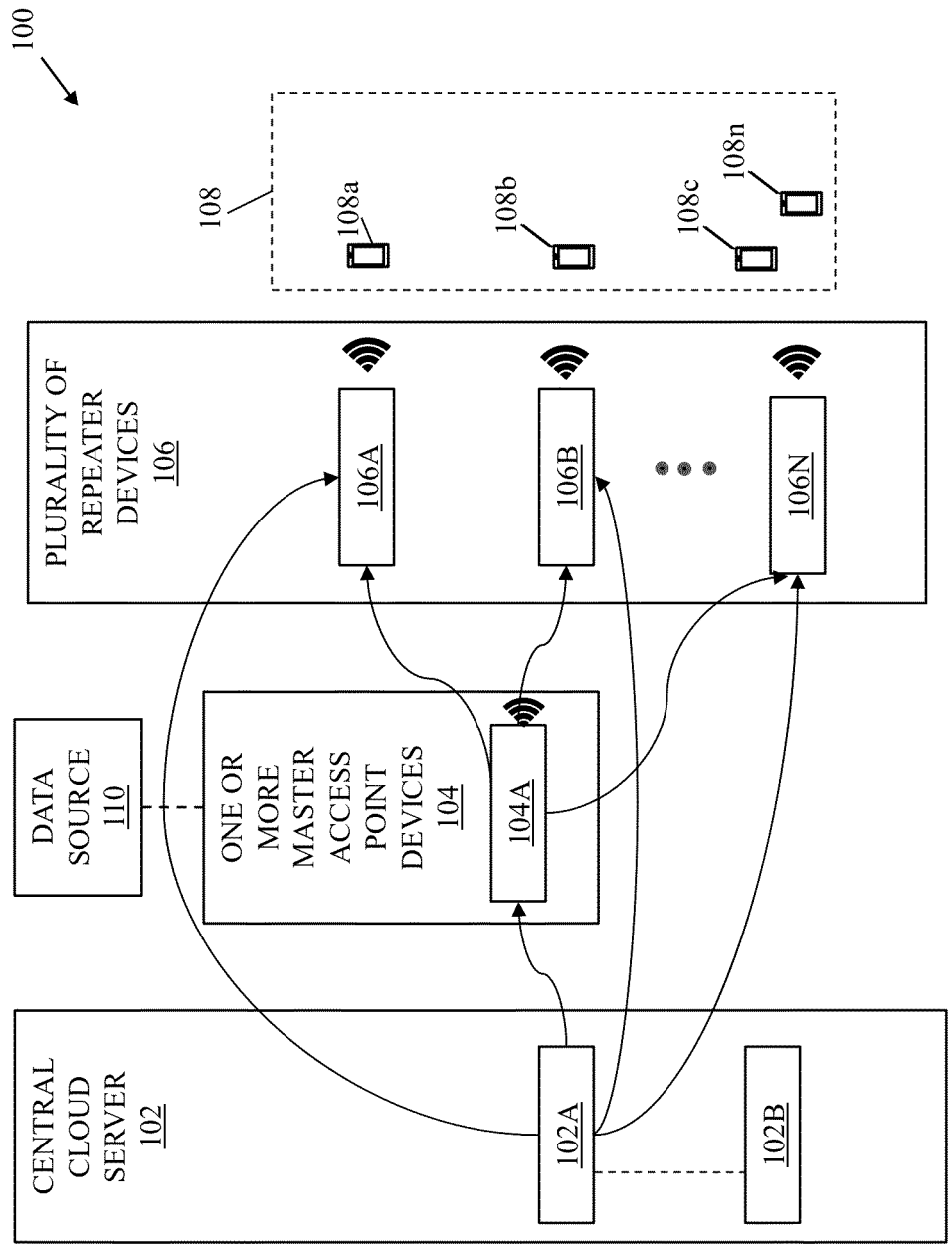
FIG. 1 is a diagram that illustrates an exemplary system for time division duplexing (TDD) synchronization in a wireless mesh network, in accordance with an exemplary embodiment of the disclosure.

Certain embodiments of the disclosure may be found in a system and a method for enhanced time division duplexing (TDD) synchronization in a wireless mesh network.

Currently, conventional Wi-Fi® systems operate in half-duplex mode, which means a device cannot transmit and receive concurrently on the same frequency. The half-duplex limitation arises because, during transmission, a device's own signal overwhelms its receiver, making the device incapable of detecting incoming signals. Further, conventional Wi-Fi® systems employ Carrier Sense Multiple Access with Collision Avoidance (CSMA/CA) to manage access to the shared medium, where wireless devices listen to a clear channel before transmitting. If the channel is busy, the wireless devices wait for a random backoff period. Such approach may be useful because, unlike wired networks using Carrier Sense Multiple Access with Collision Detection (CSMA/CD), conventional Wi-Fi® devices typically cannot detect collisions during transmission. Further, while current Wi-Fi® systems may be technically a form of TDD since the system uses time-based separation for uplink and downlink, it lacks a standardized mechanism for synchronized TDD slot coordination across devices or access points. The asynchronous nature of CSMA/CA leads to non-deterministic transmission timings, which is unsuitable for applications requiring precise uplink/downlink scheduling. Thus, alternatively stated, currently, there is no native TDD support in standard Wi-Fi® systems or Wi-Fi® networks, including those based on IEEE 802.11a/b/g/n/ac/ax/be (Wi-Fi® 1-7), which are primarily designed for half-duplex operation using CSMA/CA. Furthermore, while IEEE 802.11be (Wi-Fi® 7) introduces features like Multi-Link Operation and Fine Timing Measurement (FTM) for intra-device coordination, the IEEE 802.11be specification do not specify TDD synchronization across distributed mesh nodes. The impact of the above issues, for example, when implementing a wireless mesh network (e.g., a Wi-Fi® 7 based mesh network) may be increased packet collisions between uplink/downlink streams, unpredictable latency and jitter, harming real-time applications, inefficient spectrum-use due to lack of coordinated transmission slots, and difficulties in deploying analog repeaters or optimized backhaul systems where precise timing is required.

In contrast to conventional wireless communication systems, the system of the present disclosure includes a first repeater device of a plurality of repeater devices and a master access point (MAP) device. The first repeater device and the MAP device may implement pattern-based TDD synchronization through extended wireless local area network (WLAN) beacon (e.g., a modified or extended Wi-Fi® 7 beacon). Beneficially, the use of the extended WLAN beacon may enable the MAP device to actively control synchronization propagation across the wireless mesh network. Unlike reliance on passive beaconing in conventional systems, the MAP device in the disclosed system embeds synchronization parameters directly into a customized extended beacon, enabling controlled and timely initiation of synchronization. The MAP device may store network topology mapping information of the wireless mesh network. The MAP device may propagate extended WLAN beacons that include defined synchronization patterns and unique identifiers that designate specific target repeater devices, enabling precise sequential coordination across the wireless mesh network topology. Further, the extended WLAN beacons propagation in the specific order based on the stored network topology mapping may ensure that the synchronization signals are sent in a logical, interference-minimizing sequence. The propagation of the extended WLAN beacons in the specific order across the plurality of repeater devices prevents cross-link interference and timing drift. The propagation of the extended WLAN beacons in the specific order across the plurality of repeater devices controls the synchronization flow across the plurality of repeater devices based on the wireless mesh network topology, enabling structured and scalable synchronization.

In accordance with an embodiment, the extended WLAN beacon may include at least a first synchronization pattern and a unique identifier of a first repeater device (i.e., a target repeater device) of the plurality of repeater devices. The first repeater device may receive the extended WLAN beacon from the MAP device based on the unique identifier of the first repeater device. The first repeater device may compare the first synchronization pattern in the received extended WLAN beacon with a prestored synchronization pattern (e.g., stored locally during initialization). The use of unique identifier allows each repeater to recognize beacons targeted specifically to each repeater and to align with a known pattern, which in turn may not only improve synchronization accuracy and security but also reduces timing errors in multi-hop propagation. The comparison of synchronization patterns provides a local mechanism for pattern-based timing validation that may utilize significantly lower computational resources as compared to conventional non-pattern-based timing synchronization. The synchronization patterns eliminate the requirement for global timing references or external clock sources such as GPS or Precision Time Protocol (PTP). The approach enhances local oscillator precision through pattern-lock mechanisms deployed across the first repeater device and additional repeater devices of the plurality of repeater devices in the wireless mesh network. Furthermore, the prestored synchronization pattern at the first repeater device and additional repeater devices of the plurality of repeater devices may serve as a network-specific fingerprint that provides unique identification characteristics for the particular wireless mesh network deployment that may enable authentication and prevention of unauthorized repeater device synchronization.

Furthermore, the first repeater device of the plurality of repeater devices may be configured to iteratively adjust timing of the local oscillator based on a signal strength measurement or a signal-to-noise ratio measurement at the first repeater device, until the synchronization pattern received from the MAP device matches with the prestored synchronization pattern. The iterative adjustment of the timing of the local oscillator based on the signal strength measurement or the signal-to-noise ratio measurement may refine synchronization using channel-aware feedback rather than static configuration. The iterative adjustment of the timing of the local oscillator improves robustness to multipath fading, interference, and noise and further enables the first repeater device to dynamically adapt and achieve fine-grained time alignment.

Furthermore, the first repeater device may be configured to lock TDD signal timing at the first repeater device based on the first synchronization pattern that matches with the prestored synchronization pattern. Beneficially, the locking of the TTD signal timing based on synchronization pattern match provides a deterministic behavior in repeater timing alignment and reduces convergence time for synchronization, which is useful for maintaining coherent TDD operation across the wireless mesh network. In an implementation, the first repeater device may be further configured to forward second extended WLAN beacon to a second repeater device in the specific order based on the stored network topology mapping information for the TDD synchronization in the wireless mesh network. The propagation of the extended WLAN beacons across the wireless mesh network enables a secure chain-of-trust based synchronization relay across the wireless mesh network, which allows synchronization to scale across multi-hop networks without requiring global broadcast or centralized timing distribution, reducing traffic congestion and improving scalability.

FIG. 1 is a diagram that illustrates an exemplary system for time division duplexing (TDD) synchronization in a wireless network, in accordance with an exemplary embodiment of the disclosure. With reference to FIG. 1, there is shown a system 100 for TDD synchronization in a wireless mess network. The system 100 may include a central cloud server 102, one or more master access point (MAP) devices 104 (e.g., a MAP device 104A), and a plurality of repeater devices 106 (e.g., a first repeater device 106A, a second repeater device 106B, up to an Nth repeater device 106N). There is further shown one or more user equipment (UEs) 108 (e.g., UEs 108a, 108b, 108c, . . . , 108n) and a data source 110. The central cloud server 102 may include one or more processors, such as the processor 102A, and one or more artificial neural network (ANN) models 102B. In an implementation, the one or more MAP devices 104 and the plurality of repeater devices 106 may be collectively referred to as a plurality of network nodes of a wireless mesh network of the system 100.

The central cloud server 102 includes suitable logic, circuitry, and interfaces that may be configured to communicate with the one or more MAP devices 104 and the plurality of repeater devices 106. In an implementation, the central cloud server 102 may be communicatively coupled to each network node (e.g., communicatively coupled to the one or more UEs 108). As an example, the central cloud server 102 may be a remote management server that is managed by a third party different from the service providers associated with the plurality of different wireless carrier networks (WCNs). As another example, the central cloud server 102 may be a remote management server or a data center that is managed by a third party, or jointly managed, or managed in coordination and association with one or more of the plurality of different WCNs.

The processor 102A of the central cloud server 102 (or the one or more MAP devices 104) may be configured to cause each network node of the system 100 to determine the network topology mapping information of a plurality of neighboring network nodes around each network node. The plurality of neighboring network nodes corresponds to the plurality of repeater devices 106. Each network node may determine its position and the position of the neighboring repeater devices. In an implementation, each of the plurality of repeater devices 106 may further include a position sensor (e.g., a gyroscope) or a location sensor (e.g., a global positioning system (GPS) sensor or other geospatial location sensor). In another implementation, each network node may further include Wi-Fi® 7 capability, which may be used, for example, to determine its location coordinates or location coordinates of neighboring network nodes (e.g., nearby mesh nodes) by received signal strength indication (RSSI)-based triangulation or line-of-sight connectivity analysis. Examples of the processor 102A of the central cloud server 102 may include but are not limited to a central processing unit (CPU), graphical processing unit (GPU), a Reduced Instruction Sct Computing (RISC) processor, an Application-Specific Integrated Circuit (ASIC) processor, a Complex Instruction Set Computing (CISC) processor, and/or other processors, or state machines.

The central cloud server 102 may be configured to monitor network conditions through continuous or periodic analysis of performance metrics uploaded from the MAP device 104A and/or the plurality of repeater devices 106. The central cloud server 102 may detect a network degradation in a wireless mesh network through threshold-based analysis of synchronization accuracy metrics, packet delivery ratios, and timing drift measurements (e.g., part of the performance metrics) that may fall below predetermined performance thresholds. When the network degradation is detected, the central cloud server 102 may transmit synchronization trigger signals to the MAP device 104A including updated synchronization parameters, modified TDD configurations, or instructions to initiate network-wide resynchronization cycles to restore predetermined network performance. The synchronization trigger signals may include priority-based instructions that may specify which repeater devices require immediate attention and the sequence of corrective actions to be implemented across the wireless mesh network.

The one or more ANN models 102B of the central cloud server 102 may be periodically (e.g., daily and for different times-of-day) trained on data points (e.g., traffic pattern forecasts and channel condition predictions) uploaded to the central cloud server 102 by one or more network nodes, such as the one or more MAP devices 104, and/or the plurality of repeater devices 106. The one or more ANN models 102B may generate traffic pattern forecasts of the wireless mesh network based on historical network data to determine uplink duration and downlink duration ratios and may generate channel condition predictions for upcoming time periods to adjust TDD parameters in extended WLAN beacons. In an implementation, the one or more ANN models 102B may include Autoregressive Integrated Moving Average (ARIMA) model configured to forecast traffic patterns based on historical data, Long Short-Term Memory (LSTM) neural network configured to predict channel conditions for sequence prediction, or Deep Deterministic Policy Gradient (DDPG) model configured for reinforcement learning-based TDD parameter optimization. In some other examples, the one or more ANN models 102B may include a decision tree or a regression model configured to predict defined TDD configurations based on network traffic patterns and channel conditions.

The one or more MAP devices 104 may include suitable logic, circuitry, and interfaces that may be configured to provide access to the Internet or wireless backhaul in Wi-Fi® 7 networks and generate defined synchronization patterns for TDD synchronization across the wireless mesh network. The MAP device 104A may be configured to propagate extended WLAN beacons (that may include defined synchronization patterns, TDD parameters, Fine Timing Measurement (FTM) parameters, and unique identifiers of target repeater devices) in a specific order based on network topology mapping stored in the one or more MAP devices 104. Examples of the one or more MAP devices 104 may include, but may not be limited to a home gateway device, a Wi-Fi® 7 wireless access point, a wireless router, a Wi-Fi® 7 modem, a backplane system, an advanced router, a bridge router, a network controller, a fixed wireless access (FWA) device, a firewall device, or a network security device, or one or more combinations thereof.

The plurality of repeater devices 106 may correspond to a plurality of hybrid analog-digital repeater devices configured to perform pattern-based TDD synchronization. The plurality of repeater devices 106 may be disposed in the wireless mesh network with a MAP device 104A of the one or more MAP devices 104 such that precise timing coordination through extended WLAN beacon propagation enables synchronized TDD signal timing across the network topology. Each repeater device may include a local oscillator configured to generate TDD signals that may control analog switches (e.g., RF receive-transmit switching operation control circuit) within the repeater device for time division duplexing operations. The plurality of repeater devices 106 may receive extended WLAN beacons from the MAP device 104A or neighboring repeater devices. The plurality of repeater devices 106 may compare received synchronization patterns with prestored synchronization patterns stored locally during initialization and may implement iterative timing adjustment of their local oscillator based on signal strength measurements or signal-to-noise ratio measurements until pattern matching is achieved. The plurality of repeater devices 106 may extract timing parameters and synchronization patterns from extended WLAN beacons for analysis, particularly for TDD synchronization purposes. The extraction of synchronization patterns from the extended WLAN beacons may allow deriving timing alignment information, pattern matching results, and synchronization quality indicators by use of pattern comparison operations. The synchronization pattern comparison may provide feedback to track timing drift and maintain synchronization with the MAP device 104A and other repeater devices through iterative local oscillator timing adjustment. Thus, the precision of pattern-based synchronization may be intelligently combined with the efficiency of sequential beacon forwarding for network-wide timing coordination in the mesh architecture. The plurality of repeater devices 106 may extend the coverage area of the MAP device 104A, which may allow synchronized TDD operations across areas that may have varying propagation delays while maintaining precise timing alignment across the entire network.

Each of one or more UEs 108 may correspond to a wireless device, such as a client device or a telecommunication hardware used by an end-user to communicate within the synchronized wireless mesh network. Some of the one or more UEs 108 may refer to a combination of a mobile equipment and subscriber identity module (SIM). Examples of the one or more UEs 108 may include, but are not limited to a smartphone, a laptop, a desktop machine, a customer premise equipment, a virtual reality headset, an augmented reality device, a wireless modem, a home router, a Wi-Fi® 7 enabled smart television (TV) or set-top box, a VoIP station, or any other customized hardware for wireless communication.

In an implementation, the data source 110 of the MAP device 104A may be one or more of an optical fiber port connected to an optical fiber for an Internet connection, an Ethernet port connected to an Ethernet cable for the Internet connection, or a Wi-Fi® 7 signal received from a radio access network (RAN) node, or a satellite antenna.

Currently, in wireless mesh network technology, the 2.4 GHz and 5 GHz frequency bands are congested spectrums with limited bandwidth availability, and when deploying high-performance TDD operations, existing networks may encounter synchronization challenges due to interference and signal degradation. More advanced wireless technology, like IEEE 802.11be (Wi-Fi 7) provides enhanced capabilities including wider channel bandwidths on the 6 GHz frequency band and improved Fine Timing Measurement (FTM) support that enable more precise synchronization operations. The 6 GHz band offers cleaner spectrum with reduced interference, making it suitable for reliable extended WLAN beacon transmission and synchronization. There are many deployment scenarios requiring extended mesh coverage, such as large building complexes, campus networks, and industrial facilities where multiple repeater devices must maintain synchronized TDD operations across varying distances and propagation environments. Furthermore, network topology changes and beam routing modifications require dynamic resynchronization capabilities to maintain network-wide timing coordination. The Wi-Fi® 7 technology standards for wireless networks have enabled new possibilities for mesh deployments with enhanced synchronization features including improved beacon structures and timing measurement capabilities. However, implementing coordinated TDD synchronization across multiple network hops while maintaining timing alignment presents technical challenges for large-scale mesh network deployments.

In contrast to the conventional systems, the system 100 of the present disclosure may intelligently implement pattern-based TDD synchronization through extended WLAN beacon propagation to achieve a sequential coordination across the wireless mesh network. The pattern-based approach with enhanced TDD synchronization allows precise timing coordination through synchronization pattern comparison while maintaining network-wide timing alignment across the plurality of repeater devices 106. The system 100 of the present disclosure not only improves synchronization accuracy between network devices as compared to existing wireless systems (e.g., conventional wireless local area networks (WLANs), Wi-Fi® systems, or traditional mesh networks) but also enables precise TDD coordination with significantly reduced timing drift, improved synchronization stability and reliable network-wide timing coordination through pattern-based synchronization operations.

In accordance with an embodiment, the plurality of repeater devices 106 may be disposed at a plurality of different locations. In an exemplary implementation, the first repeater device 106A of the plurality of repeater devices 106 may be configured to receive a first wireless local area network (WLAN) signal from the MAP device 104A, via a first WLAN frequency (e.g., 5, 6, or 7 GHZ). The first repeater device 106A may be configured to convert the first WLAN signal to a first beam of radio frequency (RF) signal in an intermediate frequency band (e.g., a 5G or 6G frequency) and may further relay the first beam of RF signals in the intermediate frequency band to one or more other repeater devices of the plurality of repeater devices 106. The first repeater device 106A may also be referred to as a root node that may interface the MAP device 104A (i.e., the WAP source) and convert the first WLAN signal into intermediate frequency (IF, which may also be referred to as an Internal Frequency) for a beam mesh downstream. In some embodiments, each of the plurality of repeater devices 106 may be equipped with amplifiers (e.g., power amplifiers) and phase shifters (not shown), which enhances the first WLAN signal received from the MAP device 104A and relays it over longer distances. In an implementation, there may be more than one root node that may communicate with the MAP device 104A or other MAP devices of the one or more MAP devices 104.

In accordance with an embodiment, the plurality of repeater devices 106 may be disposed as a radio frequency (RF) bridge between the MAP device 104A and the one or more UEs 108. A data propagation path of user data relayed through a network of the plurality of repeater devices 106 may be an analog data propagation path to minimize processing delays. The analog propagation path may reduce latency to less than a threshold time. For example, the analog data propagation path may include high-frequency analog circuitry to minimize latency to nanoseconds. Multi-hop relaying of intermediate frequency signals (e.g., mmWave signals) may happen without any digital encoding or decoding of the user data (i.e., payload). Further, a backchannel connectivity and control of the network of the plurality of repeater devices 106 may be performed via a second WLAN frequency (e.g., 2.4 GHZ), based on a signal metadata of the first beam of RF signal. The second WLAN frequency may be less than the first WLAN frequency (e.g., 5, 6, or 7 GHz). While the data propagation path may remain entirely analog for lowest latency, the plurality of repeater devices 106 may extract the signal metadata from RF signals for analysis. Extraction of the signal metadata from the RF signals may allow deriving wireless metrics like timing parameters, signal quality, interference levels, channel state information, and reference signals using digital signal processing (DSP) operations. Thus, the simplicity and low latency of analog signal relaying is intelligently combined with the flexibility and intelligence of digital processing in a hybrid architecture.

In accordance with an embodiment, the plurality of repeater devices 106 may serve as a RF communication bridge between the MAP device 104A and the one or more UEs 108, which allows for the analog relay of user data through a network of the plurality of repeater devices 106. The analog transmission of the user data reduces latency because there is no need for digital encoding and decoding operations, which may introduce delays. By transmitting user data (i.e., payload) in its original analog form, the system 100 may achieve faster transmission times, making it suitable for applications that require real-time communication, such as data streaming, video streaming, online gaming, and the like. Further, separating the data propagation path and control connectivity ensures that control signals do not interfere with the data transmission path. The separation is beneficial for maintaining the quality of service and preventing degradation of the data transmission path. Further, utilizing concurrent channels for control and data connectivity may allow for simultaneous communication of control signals and data packets. By operating the concurrent channels independently, the system 100 may prevent congestion and ensure that both control and data traffic receive sufficient bandwidth and priority. The parallel approach may enhance network stability and reliability, particularly in environments with high data traffic. Furthermore, intermediate frequencies may be Millimeter-wave (mmWave) signals that may operate at higher frequencies than traditional Wi-Fi signals, enabling faster data transfer rates and lower latency. By utilizing intermediate frequencies (e.g., mmWave frequencies or other intermediate frequencies in the range of 8-300 GHZ) for analog data transmission between the MAP device 104A and the one or more UEs 108, the system 100 may achieve low-latency communication, say microseconds, making it ideal for applications that require rapid response times. Furthermore, lower frequency signals typically have better penetration and coverage, making such lower frequency signals suitable for control and coordination purposes. By leveraging lower frequency WLAN signals (e.g., Wi-Fi® signals at 2.4 or 5 GHZ) for backchannel communication, a reliable connectivity and coordination among the plurality of repeater devices 106 may be provided. The second WLAN frequency may be in a range of 2.4-5 GHz. Alternatively stated, the intelligent combination of WLAN and mmWave signals enables hybrid coordination, leveraging the strengths of both technologies for optimized network performance. WLAN provides broader coverage and connectivity, while mmWave offers high-speed, low-latency communication. By synergistic integration of the plurality of hybrid analog-digital repeater devices with the MAP device 104A, the system 100 may achieve responsive network-wide orchestration, which may enhance overall network efficiency and responsiveness.

In accordance with an embodiment, the intermediate frequency band of the first beam of RF signals may be a mmWave frequency in a range of 24-300 GHz or other intermediate frequency in the range of 8-300 GHz. In accordance with an embodiment, the first WLAN frequency and the intermediate frequency band of the first beam of RF signals may be one of a licensed mmWave spectrum of a network operator, an unlicensed mmWave spectrum, or a combination thereof. In order to minimize interference, the system 100 may be implemented as the wireless mesh network in the licensed mm Wave band, where the communication channels may experience reduced interference as the network's resilience against potential disruptions may be enhanced by interference from other networks. The exclusive use of dedicated frequencies may allow for a more robust and interference-free communication infrastructure using a combination of WLAN frequencies and licensed mmWave frequencies contributing to improved network performance and quality of service.

In contrast to conventional wireless communication systems, the MAP device 104A and the plurality of repeater devices 106 may implement pattern-based TDD synchronization through extended WLAN beacon propagation (e.g., a modified or extended Wi-Fi® 7 beacon). Beneficially, the extended WLAN beacon may enable the MAP device 104A to actively control synchronization propagation across the wireless mesh network. Unlike reliance on passive or periodic beaconing in conventional systems, the MAP device 104A may embed synchronization parameters directly into a customized extended beacon, enabling controlled and timely initiation of synchronization.

Figure 2:
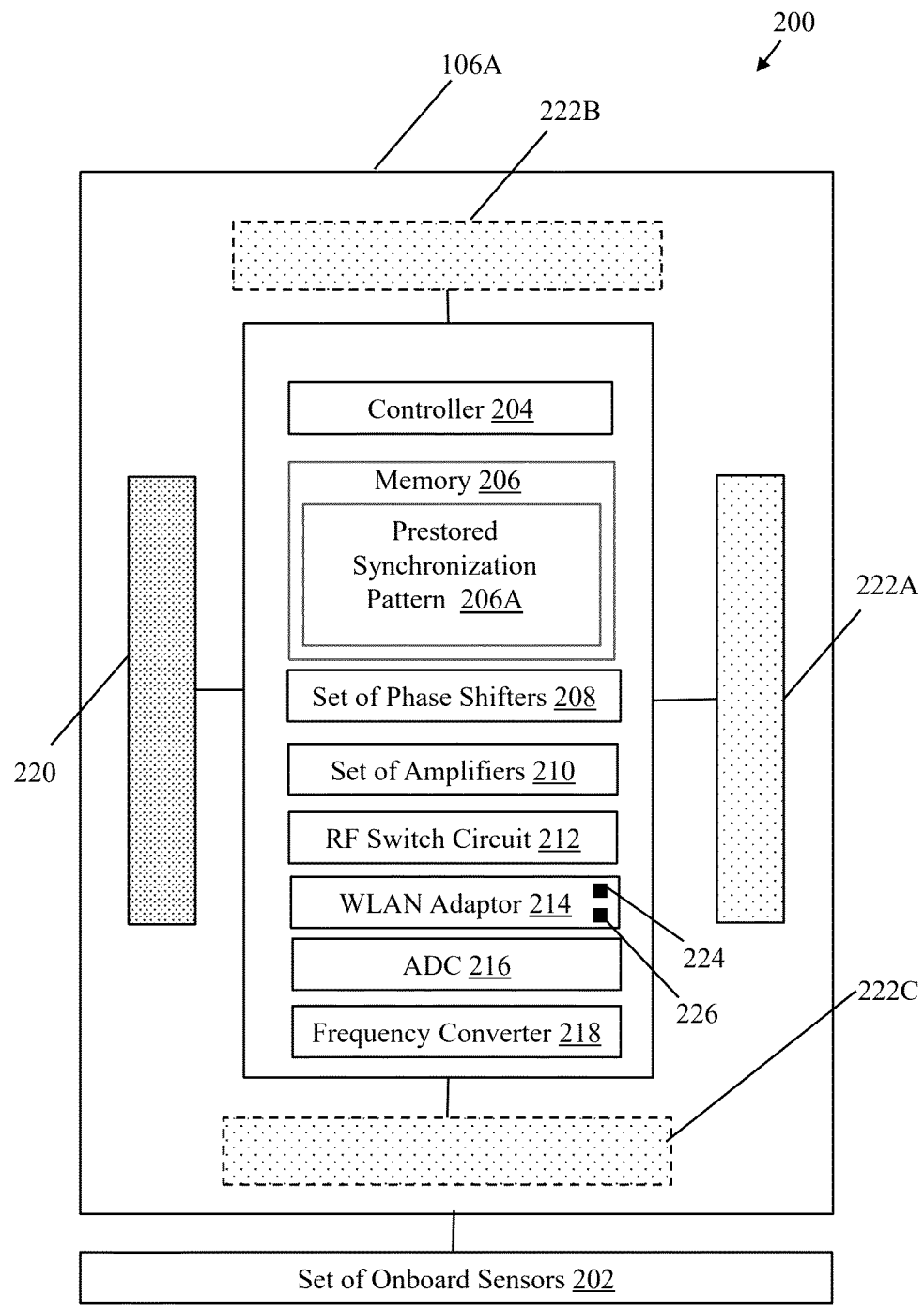
FIG. 2 is a block diagram that illustrates various components of an exemplary repeater device, in accordance with an exemplary embodiment of the disclosure.

FIG. 2 is a block diagram that illustrates various components of an exemplary repeater device in a system, in accordance with an exemplary embodiment of the disclosure. FIG. 2 is explained in conjunction with elements from FIG. 1. With reference to FIG. 2, there is shown a block diagram 200 that illustrates various components of the first repeater device 106A. The first repeater device 106A may be included in the plurality of repeater devices 106.

The first repeater device 106A may include a controller 204, a memory 206, a set of phase shifters 208, a set of amplifiers 210, a radio frequency (RF) switch circuit 212, a wireless local area network (WLAN) adaptor 214, an analog-to-digital converter (ADC) 216, and a frequency converter 218. The first repeater device 106A may further include a donor antenna 220 and one or more service phased antenna arrays 222A, 222B, and 222C. In an exemplary implementation, the first repeater device 106A of the plurality of repeater devices 106 may further include a set of onboard sensors 202. The memory 206 may be configured to store a synchronization pattern, referred to as a prestored synchronization pattern 206A.

The controller 204 may be a Field Programmable Gate Array (FPGA), which may be configured to manage digital functions like TTD parameter extraction and control channel interface to the central cloud server 102 or one or more neighboring network nodes. The controller 204 may be configured to receive an incoming RF signal relay from an upstream node and relay the incoming RF signal to one or more neighboring network nodes.

The memory 206 may include suitable logic, circuitry, and/or interfaces that may be configured to store instructions executable by the controller 204. The memory 206 may temporarily store and update the synchronized pattern, which may be periodically communicated to the central cloud server 102. Example implementations of the memory 206 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The set of phase shifters 208 may be configured to perform precise phase control to digitally steer beams in directed orientations based on control instructions received from the central cloud server 102 or one of the network nodes under control of the central cloud server 102. Alternatively, the set of phase shifters 208 may be configured to perform beam beamforming by themselves without any external instructions.

The set of amplifiers 210 may be configured to provide signal gain to overcome propagation losses and boost SNR to maintain link budgets over multiple hops of relaying, such as across the plurality of repeater devices 106, all the way to the one or more UEs 108. The set of amplifiers 210 may be high-gain amplifiers designed to operate in the intermediate frequency bands (e.g., mmWave frequencies in 24-300 GHz or other intermediate frequencies in the range of 10-300 GHZ).

The RF switch circuit 212 may be connected to the set of amplifiers 210. The RF switch circuit 212 may be configured to perform dynamic beam steering by switching between different service phased antenna arrays, such as the one or more service phased antenna arrays 222A, 222B, and 222C to route RF signals along different directions as required. The switching between different service phased antenna arrays may enable adaptable signal propagation, responding to changing network conditions and optimizing communication paths for improved reliability and performance. The dynamic beam steering capability is particularly beneficial in scenarios where the environment or network conditions may vary, allowing the system 100 to adapt and maintain efficient signal transmission.

The WLAN adaptor 214 may be configured to handle lower WLAN frequencies (e.g., 2.4 GHz or 5 GHz in Wi-Fi® 7 or 8) to establish a backchannel communication link. The establishment of the backchannel communication link may be used for various purposes, including management and coordination between devices in a wireless network. The WLAN adaptor 214 may be configured to provide a backchannel connectivity and control of the network of the plurality of repeater devices 106 via the second WLAN frequency. The WLAN adaptor 214 includes a WLAN modem 224 (e.g., a Wi-Fi® 7 modem) configured to operate in compliance with IEEE 802.11 standards, including but not limited to WLAN standards (e.g., Wi-Fi® 6 and Wi-Fi® 7). The WLAN adaptor 214 may further include a local oscillator 226 configured not only for RF signal generation but also for generating a timing signal used for controlling the TDD transmission and reception switching. The local oscillator 226 timing may be adjusted based on synchronization pattern matching and signal quality measurements. In some implementations, there may be a distinct local oscillator different from the local oscillator 226 operatively coupled to the WLAN adaptor 214 without limiting the scope of the disclosure. While the WLAN adaptor 214 may handle data reception and processing, the distinct local oscillator may generate a timing signal for TDD control, which may be adjusted iteratively based on synchronization pattern alignment and signal-to-noise ratio analysis.

The ADC 216 may be configured to convert a header portion of a RF signal (in intermediate frequency or WLAN frequency) from analog to digital domain. While the data path remains entirely analog for lowest latency, each of the plurality of repeater devices 106, such as the first repeater device 106A may extract the signal metadata from RF signals for analysis. The extraction of the signal metadata from the RF signals may allow deriving wireless metrics like timing parameters, signal quality, interference levels, channel state information, and reference signals using DSP operations.

The frequency converter 218 may be configured to up convert or down convert one radio frequency to another radio frequency of an RF signal. For example, the first repeater device 106A may utilize the frequency converter 218 to convert a WLAN signal to a beam of RF signals in an intermediate frequency band (e.g., mmWave frequencies or other intermediate frequencies in the range of 10-300 GHZ). The frequency converter 218 may perform frequency up conversion by frequency mixing of the WLAN signal with a local oscillator signal, generating an intermediate frequency (e.g., mmWave frequencies or other intermediate frequencies in the range of 10-300 GHz) for improved wireless communication performance. In some embodiments, the frequency converter 218 may include a phased locked loop (PLL) circuit, which acts as a local oscillator.

The donor antenna 220 may be communicatively coupled to a cascading receiver chain comprising various components (e.g., a set of low noise amplifiers (LNA), a set of receiver front end phase shifters, and a set of power combiners) for the signal reception (not shown for brevity). The donor antenna 220 may be configured to receive an incoming RF signal from an upstream node. The donor antenna 220 may be a WLAN antenna or a phase array antenna, such as a dual-polarized antenna.

The one or more service phased antenna arrays 222A, 222B, and 222C may be configured to relay a beam of RF signals to one or more neighboring downstream nodes. Each of the one or more service phased antenna arrays 222A, 222B, and 222C may be dual-polarized antennas, where separate antenna arrays or same antenna array with partitions (logical partitioning of antenna elements) may be used for horizontal and vertical polarizations allowing polarization diversity mechanisms. Each of the plurality of repeater devices 106 (such as the first repeater device 106A) may include multiple phased array antennas (e.g., the one or more service phased antenna arrays 222A, 222B, and 222C) with electrically steerable directive beams to focus signals along narrow beams. The phase antenna arrays may include individual phase shifters and amplifiers behind each radiating element to shape and control the beam pattern digitally.

The set of onboard sensors 202 may include one or more image sensors, a lidar sensor, a Radar, a spatial position sensor, an inertial measurement unit (IMU) sensor, and a temperature sensor. A wide range of sensors may be integrated or connected to each repeater device of the plurality of repeater devices 106 to enrich each repeater device with environmental awareness for intelligent intra-node and inter-node optimizations. The one or more image sensors may be used to visually monitor the surroundings of each network node (i.e., each repeater device). Examples of the one or more image sensors may include but are not limited to color image sensors (e.g., high-resolution RGB sensors) and infrared image sensors (e.g., IR cameras). The lidar sensor may be referred to as light detection and ranging sensors used to enable accurate three-dimensional (3D) profiling and depth perception of surroundings of each network node (i.e., each repeater device) for precise beam alignment. The Radar may be a built-in radar to detect and track motion to monitor movement patterns of surrounding objects and predict potential RF signal blockers. The spatial position sensor may be a global navigation satellite system (GNSS) sensor, such as global positioning system (GPS) to provide location awareness for each network node used for geospatial analytics and positioning capabilities. The IMU sensor may include a combination of accelerometers, gyroscopes, and magnetometers (sometimes magnetometers may not be used) that typically measures the body's specific force, angular rate, and orientation of a given body. In such a case, the raw IMU output may be processed to measure node vibrations, shocks, and orientation changes at each network node (i.e., each repeater device).

In operation, the first repeater device 106A may be configured to perform modem initialization (e.g., the WLAN modem 224) to join the wireless mesh network. The first repeater device 106A may initialize its hardware components, such as the local oscillator 226, to generate a local TDD signal for analog switches. The first repeater device 106A may switch between transmit (TX) and receive (RX) modes based on the generated local TDD signal. The first repeater device 106A may store a defined synchronization pattern received initially during initiation (initial testing and initialization) from the MAP device 104A as the prestored synchronization pattern 206A. The prestored synchronization pattern 206A may then be used as a reference pattern to match against incoming extended WLAN beacons to fine-tune the oscillator (e.g., the local oscillator 226) of the first repeater device 106A and achieve timing alignment. The first repeater device 106A may set the TDD parameters based on the values received from the MAP device 104A. Based on the TDD configuration sent by the MAP device 104A (e.g., time slot duration and guard intervals), the first repeater device 106A may set its own TDD timing parameters to stay in sync with the rest of the wireless mesh network. The present disclosure may leverage standard WLAN beacon frames that are modified and extended with synchronization-specific payloads, enabling microsecond-level TDD alignment over wireless-only infrastructure like the wireless mesh network. Similar to the first repeater device 106A, each of the plurality of repeater devices 106 may perform its modem initialization and hardware initialization.

Figure 3:
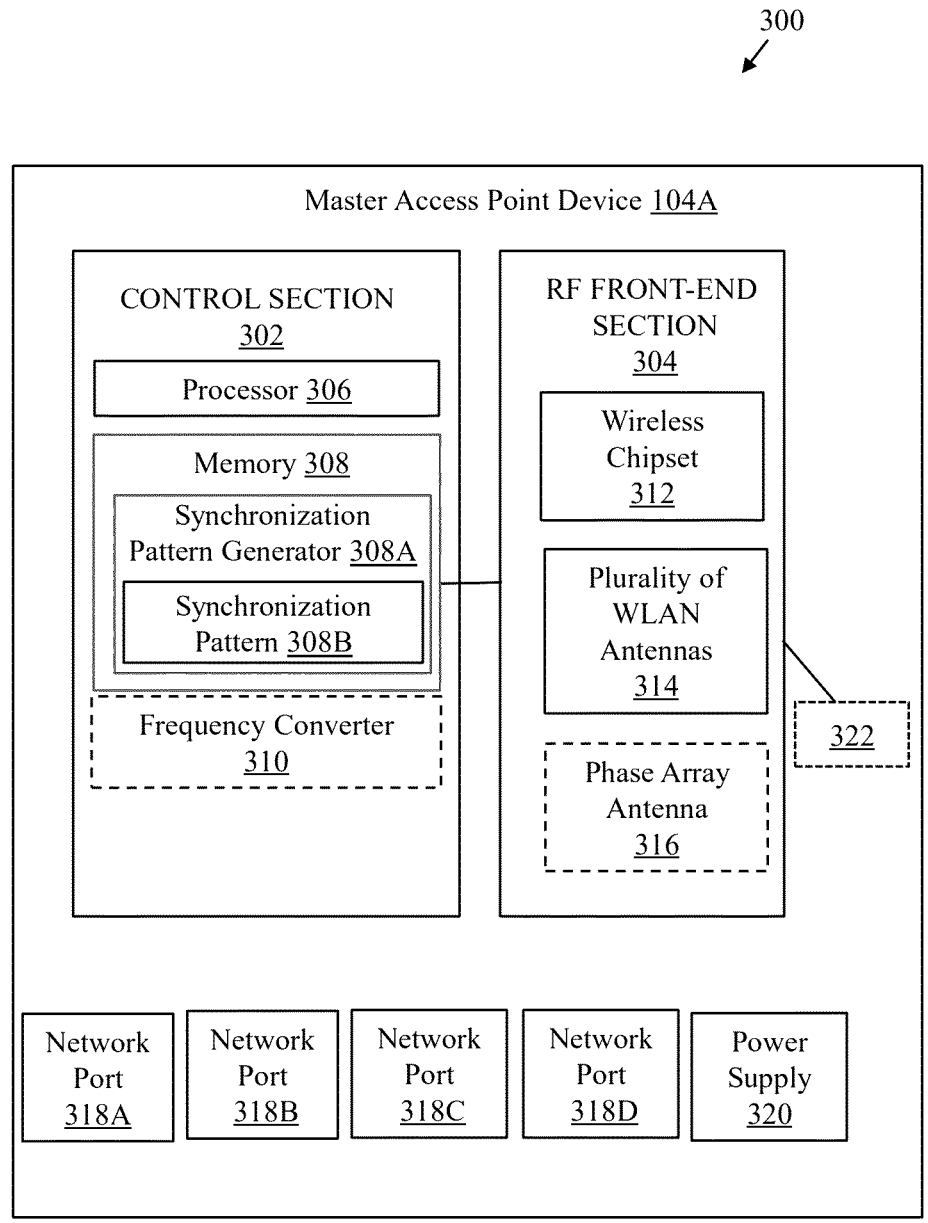
FIG. 3 is a block diagram that illustrates various components of an exemplary master access point (MAP) device, in accordance with an exemplary embodiment of the disclosure.

FIG. 3 is a block diagram that illustrates various components of an exemplary MAP device of a system, in accordance with an exemplary embodiment of the disclosure. FIG. 3 is explained in conjunction with elements from FIGS. 1 and 2. With reference to FIG. 3, there is shown a block diagram 300 of the MAP device 104A. The MAP device 104A may correspond to the one or more MAP devices 104 (FIG. 1). The MAP device 104A may include a control section 302 and a front-end RF section 304. The control section 302 may include a processor 306 and a memory 308. In an implementation, the control section 302 may include a frequency converter 310. The front-end RF section 304 may include a wireless chipset 312 and a plurality of WLAN antennas 314. In some implementations, the MAP device 104A may be modified to further include a high-gain dual polarized antenna, such as the phase array antenna 316. The MAP device 104A may include a plurality of network ports, such as network ports 318A to 318D, and a power supply 320. The processor 306 may be communicatively coupled to the memory 308, the frequency converter 310 (when provided), and the different components of the front-end RF section 304 of the MAP device 104A. There is also shown an extended WLAN beacon 322 that may be generated and transmitted by the MAP device 104A via one of the plurality of WLAN antennas 314 (or alternatively by the phase array antenna 316). The memory 308 may include a synchronization pattern generator 308A.

The frequency converter 310 may be present when a functionality of the root node (one or more of the repeater devices) is implemented in the MAP device 104A. When present, the frequency converter 310 may be used to up convert or down convert frequencies.

The wireless chipset 312 may be a hardware component responsible for generating and transmitting the first extended WLAN beacon (e.g., the extended WLAN beacon 322) as well as WLAN signals, supporting multiple frequency bands including lower frequencies optimized for synchronization signal transmission and higher frequencies for data communication. The wireless chipset 312 may process the first extended WLAN beacon (e.g., the extended WLAN beacon 322) including modulation of the first synchronization pattern (e.g., the synchronization pattern 308B) and the unique identifier information, TDD parameter encoding, and signal amplification to ensure reliable delivery to the plurality of repeater devices 106. The wireless chipset 312 may include radio elements that convert the first extended WLAN beacon (e.g., the extended WLAN beacon 322) into radio waves for transmission and support concurrent operation across multiple frequency bands for coordinated data and extended WLAN beacon transmission.

The plurality of WLAN antennas 314 may be configured to transmit and receive WLAN signals and the first extended WLAN beacon (e.g., the extended WLAN beacon 322) containing the first synchronization pattern (e.g., the synchronization pattern 308B). The plurality of WLAN antennas 314 may be in MIMO configuration for performing MU-MIMO and beamforming to enhance coverage and signal strength, for the one or more UEs 108. The number of antennas in the MIMO configuration may vary depending on use case, for example 2×2, 4×4 or 8×8 MIMO configurations may be provided. In some implementations, alternatively, the MAP device 104A may be modified to include one or more high-gain antennas, such as the phase array antenna 316 to capture a 5G or 6G mm Wave cellular signal from a radio access network (RAN) node (e.g., a gNB or a 5G or 6G small cell) and/or to relay a mm Wave signal to one or more repeater devices of the plurality of repeater devices 106.

The network port 318A may be an optical fiber port. The network port 318B may be an Ethernet port. The network port 318C may be a WLAN Fast Ethernet (FE) port. The network port 318D may be a USB port. The power supply 320 may be configured to provide power to the various components of the MAP device 104A.

In operation, there may be an initial network setup phase. The MAP device 104A may be configured to determine the network topology mapping information based on position information of the plurality of repeater devices 106 and line-of-sight connectivity among the plurality of repeater devices 106. The determination of the network topology mapping information may begin with collecting position information of the plurality of repeater devices 106. The position information of the plurality of repeater devices 106 may include physical coordinates, elevation data, and spatial relationships between the plurality of repeater devices 106 that may enable the MAP device 104A to construct a three-dimensional map of the wireless mesh network deployment. The MAP device 104A may perform signal strength surveys and connectivity analysis by transmitting test signals to each repeater device and measuring received signal strength indicators (RSSI), signal-to-noise ratios (SNR), and path loss characteristics to assess communication link quality between the plurality of repeater devices 106. The MAP device 104A may evaluate line-of-sight connectivity among the plurality of repeater devices 106 via analysis of the collected position information to identify physical obstacles such as buildings, terrain features, or other obstructions that may interfere with direct signal propagation among the plurality of repeater devices 106. The MAP device 104A may correlate geometric analysis with measured signal quality metrics to determine repeater devices of the plurality of repeater devices 106 that may reliably communicate with each other for synchronization purposes.

In accordance with an embodiment, the MAP device 104A may be configured to determine a specific order (e.g., of transmission sequence) to transmit one or more extended WLAN beacons to one or more repeater devices of the plurality of repeater devices 106. The specific order of transmission sequence may ensure that each repeater device of the plurality of repeater devices 106 may receive synchronization signals with sufficient signal quality for accurate pattern matching and timing alignment. The MAP device 104A may process the network topology mapping information to calculate the transmission sequence. For example, in a wireless mesh network deployment that may include three repeater devices positioned across an urban environment, the MAP device 104A may first determine that the first repeater device 106A may be positioned within direct line-of-sight and defined signal range from the MAP device 104A, while a second repeater device 106B may have line-of-sight connectivity to the first repeater device 106A but not to the MAP device 104A due to building obstruction. A third repeater device may maintain line-of-sight with the second repeater device 106B but may experience signal attenuation from the first repeater device 106A. Based on the topology analysis, the MAP device 104A may establish a specific order, ensuring that synchronization may propagate through reliable communication paths while maintaining signal integrity sufficient for successful pattern recognition and timing synchronization throughout the sequential transmission operation. The determination operation may update the network topology mapping information, and the specific order (of transmission sequence) based on dynamic changes in line-of-sight connectivity, signal quality degradation, or repositioning of some repeater devices of the plurality of repeater devices 106, which may enable adaptive synchronization routing that may maintain defined performance as network conditions evolve.

In accordance with an embodiment, the MAP device 104A may be further configured to store the network topology mapping information. In an embodiment, the MAP device 104A may be configured to store the network topology mapping information by maintaining a comprehensive database of the wireless mesh network's physical and logical structure within its memory subsystem. The MAP device 104A may be configured to store the network topology mapping information in non-volatile memory, such as flash storage or EEPROM, to ensure persistence across power cycles and system resets. In some embodiments, the processor 306 may be configured to store network topology mapping information in the memory 308. The network topology mapping information includes information pertaining to position of the plurality of repeater devices 106, and line-of-sight information among the plurality of repeater devices 106. The network topology mapping information may be indicative of the network topology of the wireless mesh network.

As an example, the network topology mapping information may be stored as a graph data structure in the memory 308 where each repeater device may be represented as a node containing device identification, position coordinates, and signal quality metrics, while edges between nodes may represent communication links with associated path loss values, propagation delays, and line-of-sight connectivity status. The specific order determination may implement graph traversal algorithms such as breadth-first search or depth-first search to identify optimal synchronization propagation paths that may not only minimize hop count but also maximize signal quality between consecutive devices in the sequential transmission chain. The topology mapping may be dynamically updated through periodic device discovery operations, signal quality assessments, and connectivity verification procedures that may ensure the specific order reflects current network conditions and maintains synchronization reliability across the wireless mesh network deployment.

In accordance with an embodiment, the processor 306 may be configured to generate a defined synchronization pattern (e.g., the synchronization pattern 308B) in each synchronization cycle, where each synchronization cycle coordinates timing across the plurality of network nodes of the wireless mesh network. The processor 306 may be configured to generate and periodically update the defined synchronization pattern using the synchronization pattern generator 308A. The MAP device 104A may generate a unique sequence of digital bits to create a network-specific synchronization pattern. The synchronization pattern 308B may be created using pseudo-random algorithms, cryptographic methods, or other bit generation techniques. The generated synchronization pattern (e.g., the synchronization pattern 308B) may be stored in the memory 308 as binary data or encoded sequences. The synchronization pattern 308B may include network coordination information for timing alignment purposes. In an example, the synchronization pattern 308B may include header information including device identification data, timing reference parameters, or network configuration metadata. In other examples, the synchronization pattern 308B may serve as a network-specific fingerprint for authentication and authorization of one or more repeater devices joining the wireless mesh network.

In accordance with an embodiment, the MAP device 104A may be further configured to embed timestamps within the first synchronization pattern (e.g., the synchronization pattern 308B). The embedding may include insertion of time reference data directly into a data structure of the first synchronization pattern (e.g., the synchronization pattern 308B). In some embodiments, the MAP device 104A may be configured to generate the timestamps using a local clock system of the MAP device 104A. Then, the MAP device 104A may be configured to place the timestamps at defined bit positions within the first synchronization pattern (e.g., the synchronization pattern 308B) during the generation of the first synchronization pattern (e.g., the synchronization pattern 308B). For example, the MAP device 104A may embed a 64-bit timestamp representing nanosecond-precision timing data within defined header bits of the first synchronization pattern (e.g., the synchronization pattern 308B). The timestamp data may be encoded into defined bit sequences of the first synchronization pattern (e.g., the synchronization pattern 308B) before transmission within the first extended WLAN beacon. The MAP device 104A may ensure that the embedded timestamps maintain synchronization pattern integrity while providing precise timing reference information for subsequent processing by receiving devices.

In accordance with an embodiment, the processor 306 may embed the first synchronization pattern (e.g., the synchronization pattern 308B) and a unique identifier of the first repeater device 106A of the plurality of repeater devices 106 within the first extended WLAN beacon (e.g., the extended WLAN beacon 322). The generated synchronization pattern (e.g., the synchronization pattern 308B) may then be embedded into Wi-Fi® 7 beacon frames using various methods. The embedding methods may include but are not limited to direct insertion into beacon payload fields, distributed placement across multiple beacon sections, or integration with existing beacon content. Alternatively stated, the synchronization pattern bits in the synchronization pattern 308B may be encoded using various techniques including, but not limited to, direct binary representation, Manchester encoding, differential encoding, spread spectrum coding, or other digital encoding schemes. The specific arrangement, positioning, and encoding of the sequential bits within the extended WLAN beacon structure may not be considered limiting to scope of the present disclosure, provided that the first repeater device 106A or other repeater devices of the plurality of repeater devices 106 may extract and compare the bit sequence for synchronization pattern matching as described herein, in an example. The WLAN (e.g., Wi-Fi®) beacon frame (that may include the synchronization pattern 308B) may be converted from digital data to a radio frequency signal, such as a first extended WLAN beacon (e.g., the extended WLAN beacon 322).

As an example, the synchronization pattern bits may be arranged within the extended WLAN beacon 322 (e.g., the modified Wi-Fi® 7 beacon) using various non-limiting configurations, such as dedicated field placement where the complete bit sequence like "101101001010" may be inserted as a contiguous block within a specific beacon payload section positioned after standard Wi-Fi® fields including SSID and timestamp information and before other TDD parameter data, or distributed bit positioning where individual pattern bits may be interspersed across multiple beacon fields with the first bit "1" appended to the SSID field, the second bit "0" embedded within the timestamp field, the third bit "1" integrated into the channel information field, and subsequent bits distributed throughout remaining information elements. Alternatively, a header integration technique may be used where the synchronization pattern bits "1011" may be combined with existing beacon header content "1100" using XOR operations to produce modified header bits "0111" that may include both original beacon information and embedded pattern data, or time-based sequence encoding where the synchronization pattern "1011" is represented through controlled transmission timing variations such that the first bit "1" corresponds to a fifty nanosecond transmission delay, the second bit "0" uses normal beacon timing, the third bit "1" applies another fifty nanosecond delay, and the fourth bit "1" maintains the fifty nanosecond offset, resulting in a temporal transmission sequence that conveys the synchronization pattern through beacon timing characteristics rather than explicit bit content placement.

In accordance with an embodiment, the first extended WLAN beacon (e.g., the extended WLAN beacon 322) may include the first synchronization pattern (e.g., the synchronization pattern 308B) and the unique identifier of the first repeater device 106A. The extended WLAN beacon 322 may include standard 802.11 fields such as SSID, timestamp, and channel configuration, as well as a new TDD-specific extension fields, such as a TDD frame length that may indicate a duration of each TDD cycle (e.g., 10 ms), an Uplink/Downlink slot ratios in percentage that may indicate a slot ratio (e.g., 40% UL/60% DL), guard intervals indicative of inter-slot buffer to prevent overlap (e.g., 50 μs), sync pattern ID indicative of an identifier of the specific synchronization pattern used, a target analog repeater ID that may identify the repeater device intended to lock to the extended WLAN beacon 322, and optionally FTM parameters. Such extended fields may enable precise mesh-wide time division duplexing alignment, allow topology-aware propagation of synchronization messages, and support both pattern-based and FTM-based synchronization.

In accordance with an embodiment, the first extended WLAN beacon further includes Fine Timing Measurement (FTM) parameters. The MAP device 104A may include the FTM parameters into defined data fields of the first extended WLAN beacon during the generation of the first extended WLAN beacon. The MAP device 104A may generate the FTM parameters using precision timing measurement protocols. For example, the MAP device 104A may include the FTM parameters such as timing synchronization function timestamps, measurement accuracy indicators, and propagation delay estimation values within defined information elements of the first extended WLAN beacon. The incorporation operation may include encoding the FTM parameters into defined header sections of the first extended WLAN beacon. The FTM parameters may enable precise timing measurements between the MAP device 104A and one or more repeater devices of the plurality of repeater devices at a receiving end for synchronization accuracy enhancement.

In accordance with an embodiment, the first extended WLAN beacon (e.g., the extended WLAN beacon 322) may further include a first type of encryption for control plane communication, a second type of encryption for control message authentication, and a third type of encryption for beacon content protection. The first type of encryption may include end-to-end encryption of control messages that may prevent unauthorized interception of synchronization parameters. The end-to-end encryption of control messages allows mutual authentication among network nodes that corresponds to the plurality of repeater devices 106. The authentication among the network nodes ensures that legitimate repeater devices may participate in the TDD synchronization operation. The first type of encryption may further enable session key management that may enable secure distribution of synchronization patterns while protecting against man-in-the-middle attacks that may compromise timing coordination across the wireless mesh network. The second type of encryption for control message authentication may employ Secure Hash Algorithm (SHA-256) to generate message authentication codes (MACs) that may verify integrity and authenticity of control messages exchanged between the MAP device 104A and repeater devices. The second type of encryption may provide detection of unauthorized modification of TDD signal timing during transmission. The second type of encryption may prevent replay attacks where previously captured synchronization messages are retransmitted to disrupt network timing. The second type of encryption may provide a cryptographic proof of message origin that may ensure that synchronization commands originating from the MAP device 104A is legitimate rather than malicious sources attempting to interfere with network operations.

In accordance with an embodiment, the third type of encryption for first extended WLAN beacon (e.g., the extended WLAN beacon 322) content protection may utilize Advanced Encryption Standard (AES) encryption applied specifically to beacon frames containing synchronization information and TDD parameters. The beacon content encryption may provide confidentiality protection to prevent unauthorized network nodes from accessing or analyzing the synchronization patterns used for timing alignment. The third type of encryption may further provide protection against eavesdropping attacks where adversaries may attempt to capture and reverse-engineer the synchronization methodology. The third type of encryption may enable secure transmission of timing-sensitive information to maintain network security integrity throughout the TDD synchronization operation.

In accordance with an embodiment, alternatively, the first type of encryption for control plane communication may implement WPA3-SAE protocols for secure device authentication and session key establishment between the MAP device 104A and repeater devices, providing mutual authentication and protection against dictionary attacks. The second type of encryption for control message authentication may utilize HMAC-SHA256 to generate unique digital signatures for TDD parameter updates, synchronization commands, and network configuration messages, ensuring message integrity and preventing unauthorized modification during transmission. The third type of encryption for beacon content protection may apply AES-256 encryption in cipher block chaining mode specifically to synchronization pattern data, TDD timing parameters, and device identification information within extended WLAN beacon frames, maintaining confidentiality of timing-sensitive information while preserving the precision required for sub-microsecond synchronization accuracy.

In accordance with an embodiment, the first type of encryption may implement end-to-end encryption protocols including Advanced Encryption Standard (AES) with 256-bit keys for control message confidentiality, RSA public-key cryptography for secure key exchange between the MAP device 104A and one or more repeater devices of the plurality of repeater devices 106, and elliptic curve cryptography for efficient device authentication operations. The second type of encryption may utilize Hash-based Message Authentication Code (HMAC) with SHA-256 to generate unique digital signatures for each control message, preventing unauthorized modification during transmission and enabling verification of message integrity at receiving devices through cryptographic validation operations. The third type of encryption may apply AES encryption in cipher block chaining mode specifically to beacon frame headers and synchronization pattern data, ensuring that timing-sensitive information remains protected against eavesdropping while maintaining the precision required for sub-microsecond synchronization accuracy across the wireless mesh network deployment.

In accordance with an embodiment, the MAP device 104A may be further configured to propagate the first extended WLAN beacon (e.g., the extended WLAN beacon 322) to the plurality of repeater devices 106 in a specific order based on the stored network topology mapping information stored in the MAP device 104A. The specific order may refer to a transmission sequence that the MAP device 104A may determine based on the network topology mapping information. The specific order of propagation may ensure that synchronization propagates sequentially through the wireless mesh network in an optimized manner. The network topology mapping information stored in the MAP device 104A may include information about physical arrangement and connectivity relationships between the plurality of repeater devices 106. The network topology mapping information may enable the MAP device 104A to determine an efficient sequence for synchronization pattern transmission that may maximize probability of successful pattern reception and timing alignment across the plurality of repeater devices 106 in the wireless mesh network. The MAP device 104A may transmit the first extended WLAN beacon (e.g., the extended WLAN beacon 322) on a 5 GHz or 6 GHz frequency band using OFDM modulation and antenna systems, such as the plurality of WLAN antennas 314 or the 314 or the phase array antenna 316.

In accordance with an embodiment, the first repeater device 106A may be configured to initialize the local oscillator 226 to generate TDD signals configured to control one or more analog switches within the first repeater device 106A. The initialization of the local oscillator 226 may be performed to power up oscillator circuitry, configure frequency generation parameters, and establish baseline timing characteristics that may subsequently be refined during the synchronization operation with the MAP device 104A. The initialization operation may begin with the first repeater device 106A activating local oscillator hardware components such as crystal oscillators, phase-locked loop (PLL) circuits, and frequency synthesis modules that generate fundamental timing signals required for TDD signal generation. The initialization of the local oscillator 226 may include calibration operations where the first repeater device 106A may perform self-test operations to verify oscillator stability, frequency accuracy, and phase noise characteristics, ensuring that timing generation circuitry may meet precision requirements necessary for subsequent synchronization with the MAP device 104A and coordination with other repeater devices of the plurality of repeater devices 106 in the wireless mesh network.

In accordance with an embodiment, the initialization of the local oscillator 226 to generate TDD signals may require the local oscillator 226 to produce precise timing pulses. The TTD signals enable the analog switches to toggle between transmit and receive modes according to time division duplex protocol established by the MAP device 104A. The local oscillator 226 may be initialized with default TDD parameters. The default TDD parameters may include initial uplink and downlink time slot durations, guard interval specifications, and frame timing characteristics. The frame timing characteristics may provide a baseline operational state before synchronization refinement, enabling the first repeater device 106A to participate in the wireless mesh network while awaiting precise timing alignment with the MAP device 104A. During initialization, the local oscillator 226 may be programmed to generate TDD signal edges with adjustable delay characteristics that may be fine-tuned during the synchronization operation, providing timing flexibility necessary for achieving precise pattern matching with the first synchronization pattern (e.g., the synchronization pattern 308B) received from the MAP device 104A. During initialization, the first repeater device 106A may also store the previously received synchronization pattern from the MAP device 104A as the prestored synchronization pattern 206A in the memory 206.

In accordance with an embodiment, the first repeater device 106A of the plurality of repeater devices 106 may be further configured to receive the first extended WLAN beacon (e.g., the extended WLAN beacon 322) from the MAP device 104A based on the unique identifier of the first repeater device 106A. In an example, the WLAN modem 224 of the first repeater device 106A may monitor wireless channel for incoming extended WLAN beacon transmissions while operating in a reception mode that may enable detection of the first extended WLAN beacon (e.g., the extended WLAN beacon 322) including synchronization information. Once the MAP device 104A may have transmitted the first extended WLAN beacon (e.g., the extended WLAN beacon 322), the first repeater device 106A may receive the first extended WLAN beacon (e.g., the extended WLAN beacon 322) after an analog switch point, which may be controlled by TDD time signal generated by the local oscillator 226. The analog switch point may ensure that reception of the first extended WLAN beacon (e.g., the extended WLAN beacon 322) may occur during an appropriate time slot when the first repeater device 106A may be configured to receive signals rather than transmit signals. Upon successful reception and initial processing, the first repeater device 106A may extract the first synchronization pattern (e.g., the synchronization pattern 308B) from the received first extended WLAN beacon (e.g., the extended WLAN beacon 322), along with associated timing parameters, TDD configuration information, and any embedded timestamps or FTM parameters that may be used for subsequent synchronization operations and timing adjustments of the local oscillator 226. The WLAN modem 224 may perform error detection and correction on received beacon data to ensure signal integrity and accurate extraction of synchronization information. The information received in the form of the first extended WLAN beacon (e.g., the extended WLAN beacon 322) may then be processed by the first repeater device 106A.

In accordance with an embodiment, the first repeater device 106A may operate in a WLAN modem mode at a time of reception and comparison of the first synchronization pattern (e.g., the synchronization pattern 308B) with the prestored synchronization pattern 206A. The WLAN modem mode that corresponds to the WLAN modem 224 may improve pattern detection accuracy and timing precision. The first repeater device 106A that operates in the WLAN modem mode may isolate the first synchronization pattern (e.g., the synchronization pattern 308B) from background noise and interference sources. The first repeater device 106A that operates in the WLAN modem mode manifests improved pattern comparison reliability through error correction coding and signal enhancement features leveraging the WLAN modem 224 that may ensure accurate extraction of timing information even under marginal signal conditions.

In an implementation, the prestored synchronization pattern 206A may include a unique, pseudo-random code sequence known only to devices within the wireless mesh network. The pseudo-random code sequence may be initially generated by the MAP device 104A using the one or more ANN models 102B, for example, a LSTM network or an ARIMA model that may analyze network traffic patterns and channel conditions to generate synchronization patterns. The generated synchronization patterns may provide robust timing reference while minimizing susceptibility to interference and false pattern detection. The one or more ANN models 102B may be trained on historical network performance data that includes signal quality measurements, timing accuracy metrics, and synchronization success rates collected from previous network deployments. The historical network performance data may enable the one or more ANN models 102B to learn defined pattern characteristics that may maximize synchronization reliability across diverse operational conditions and network topologies. The training dataset may include at least 10,000 labelled samples including RSSI measurements ranging from −30 dBm to −90 dBm, SNR values from 0 dB to 40 dB, timing jitter measurements with nanosecond precision, and corresponding optimal synchronization patterns that achieved sub-microsecond accuracy. The LSTM network may include input layers with 128 nodes configured to receive temporal sequences of network performance data, two hidden layers with 256 and 128 nodes respectively using ReLU activation functions, and output layers with 64 nodes generating probabilistic distributions for channel condition predictions. The ARIMA model may be configured with autoregressive orders (p) ranging from 1-5, differencing degrees (d) of 0-2, and moving average terms (q) from 1-3, optimized through grid search validation on traffic pattern datasets spanning 6-month operational periods.

In accordance with an embodiment, the training operation of the one or more ANN models 102B may include supervised or semi-supervised learning using labeled datasets with 80% training data, 15% validation data, and 5% test data splits. The training datasets may include over 50,000 network performance samples collected across diverse operational scenarios including urban dense deployments with 20-100 repeater devices, suburban linear deployments spanning 100 meters to 2-5 kilometers, and indoor enterprise deployments with complex interference patterns. Each training sample may include input feature vectors including signal quality measurements (RSSI, SNR, bit error rates), temporal traffic patterns (hourly/daily/weekly usage cycles), network topology parameters (device count, geographic distribution, line-of-sight connectivity), and environmental conditions (temperature, humidity, interference sources). The corresponding output labels may specify optimal TDD parameters including uplink/downlink duration ratios (ranging from 30%/70% to 70%/30%), guard interval specifications (1-50 microseconds), and synchronization pattern update frequencies (50-500 milliseconds). The model training may utilize stochastic gradient descent with Adam optimizer, learning rates starting at 0.001 with exponential decay, batch sizes of 64-128 samples, and convergence criteria of less than 0.1% validation loss change over 10 consecutive epochs.

In accordance with an embodiment, the MAP device 104A may be configured to generate traffic pattern forecasts based on historical network data to determine uplink duration and downlink duration ratios. In some examples, the MAP device 104A may execute the one or more ANN models 102B to generate traffic pattern forecasts based on historical network data. The one or more ANN models 102B may include the ARIMA model that may analyze temporal dependencies and trends in network traffic data to predict future traffic loads accurately, enabling the MAP device 104A to determine defined uplink duration and downlink duration ratios for TDD schedule optimization. The ARIMA model may process historical traffic patterns by examining time-series data including packet transmission rates, bandwidth utilization patterns, and traffic volume fluctuations over various time intervals to identify recurring patterns and seasonal variations that may influence network demand. The identification of the recurring patterns and seasonal variations allows the MAP device 104A to forecast anticipated traffic loads and adjust TDD parameters proactively to accommodate predicted network usage patterns. The one or more ANN models 102B may include the LSTM neural network that may be configured to predict channel conditions. The LSTM model may learn complex patterns and dependencies in channel condition sequences including signal strength variations, interference levels, and propagation characteristics to anticipate future channel states and optimize TDD scheduling accordingly. The LSTM neural network may process multi-dimensional input data comprising signal quality measurements, environmental factors, and interference patterns from multiple repeater devices to generate channel condition predictions that may enable the MAP device 104A to adjust the TDD parameters based on anticipated wireless channel performance. The adjustment of the TDD parameters may ensure enhanced resource allocation and minimization of interference effects across the wireless mesh network topology.

In accordance with an embodiment, the MAP device 104A may utilize the one or more ANN models 102B to dynamically generate initial TDD schedules by integration of the traffic pattern forecasts from ARIMA model with channel condition predictions from the LSTM network. The integration may create optimized time division duplex configurations that may balance network traffic demands with wireless channel capabilities to maximize throughput and minimize latency across the wireless mesh network. The MAP device 104A may refine TDD parameter selection by learning from network performance feedback. The MAP device 104A may refine TDD parameter selection further based on the adjustment of the uplink and downlink duration ratios based on real-time traffic patterns and channel conditions. The MAP device 104A may predict TDD configurations for varying network scenarios including peak usage periods, low-traffic intervals, and changing environmental conditions. The integration of ARIMA and LSTM models may improve proactive TDD optimization that may anticipate network demands before demands occur. The integration of ARIMA and LSTM models may further improve adaptive scheduling that may respond to dynamic channel conditions and traffic patterns. The integration of ARIMA and LSTM models may enable improved network efficiency through data-driven parameter selection that may maximize resource utilization and enable the MAP device 104A to maintain TDD configurations despite varying operational conditions and network topology changes throughout the wireless mesh network deployment.

In accordance with an embodiment, the MAP device 104A may generate traffic pattern forecasts of the wireless mesh network. The MAP device 104A may analyze historical network data over multiple time periods such as hourly, daily, and weekly intervals to identify recurring traffic patterns and seasonal variations. The MAP device 104A may calculate moving averages of data transmission rates, peak usage periods, and bandwidth utilization patterns to generate baseline traffic models that may predict future network demand. The forecasting process may include trend analysis operations where the MAP device 104A may examine historical data points spanning previous 30 to 90-day periods to identify increasing or decreasing traffic trends. The MAP device 104A may correlate analysis between time periods to determine cyclical patterns such as business hours versus off-hours usage, and regression analysis to extrapolate future traffic loads based on identified trends. The MAP device 104A may implement threshold-based classification where traffic levels may be categorized into low, medium, and high demand periods. The threshold-based classification may enable automated TDD parameter selection that may allocate uplink duration ratios of 30-40% during low-demand periods, 50-60% during medium-demand periods, and 60-70% during high-demand periods based on predicted traffic characteristics.

In accordance with an embodiment, the MAP device 104A may acquire signal strength measurements, interference level data, and propagation delay variations from the plurality of repeater devices 106. The acquisition may occur over sliding time windows ranging from 10-minute to 2-hour intervals. In the channel condition prediction, the moving averages of signal quality metrics may be calculated to establish baseline channel performance. The channel condition prediction may identify periodic interference patterns such as daily electromagnetic interference from industrial equipment or weather-related signal variations and may apply linear regression analysis to project signal quality trends for prediction windows of 15-60 minutes. The MAP device 104A may implement predictive classification where anticipated channel conditions may be categorized as excellent with SNR greater than 25 dB, good with SNR between 15-25 dB, fair with SNR between 10-15 dB, or poor with SNR less than 10 dB. The predictive classification may enable proactive TDD parameter adjustments including extended guard intervals during predicted poor channel conditions, optimized uplink and downlink ratios based on anticipated channel capacity, and alternative routing preparation when severe channel degradation may be predicted.

In accordance with an embodiment, the MAP device 104A may be configured to generate a channel condition prediction for an upcoming time period. The channel condition prediction may be generated based on a trend in signal quality measurements at the plurality of repeater devices 106 to adjust TDD parameters in the first extended WLAN beacon (e.g., the extended WLAN beacon 322). The prediction may provide improved spectral efficiency by adjusting TDD parameters to exploit predicted channel conditions and avoid anticipated interference periods. The adjustment of the TDD parameters may maximize data transmission opportunities during defined channel windows while minimizing resource allocation during predicted poor channel conditions. The prediction may provide reduced packet loss and latency through preemptive scheduling adjustments. The preemptive scheduling adjustments may accommodate predicted channel impairments before impairments impact ongoing communications. The preemptive scheduling adjustments may optimize resource allocation to maximize network throughput by aligning TDD parameters with predicted channel capacity and quality characteristics.

In accordance with an embodiment, the channel condition prediction for the upcoming time period may include analysis of temporal signal quality trends, interference pattern forecasting, and propagation characteristic modeling. The analysis may anticipate wireless channel performance over prediction windows ranging from 1-60 minutes. In the channel condition prediction, the MAP device 104A may utilize historical signal quality data, environmental sensor inputs, and network topology changes. The utilization may generate probabilistic forecasts of channel conditions. The generated probabilistic forecasts of channel conditions may enable proactive TDD parameter adjustments before channel degradation may impact network performance. The upcoming time period predictions may include anticipated interference patterns, signal strength variations, and predicted propagation delay changes. The upcoming time period predictions may allow the MAP device 104A to preemptively modify TDD schedules and synchronization parameters to maintain predetermined network performance levels.

In accordance with an embodiment, the first repeater device 106A may be further configured to measure the signal strength (may be interchangeably referred to as the received signal strength indicator (RSSI)) of the received first extended WLAN beacon (e.g., the extended WLAN beacon 322). The first repeater device 106A may be configured to monitor received power level of the first extended WLAN beacon (e.g., the extended WLAN beacon 322) during reception window. The monitoring may utilize automatic gain control (AGC) circuits and power detection operations within the WLAN modem 224 to accurately quantify signal amplitude regardless of the variations in receiver sensitivity or dynamic range requirements. The RSSI measurement may incorporate calibration factors and temperature compensation to ensure accurate power level readings across varying environmental conditions. The RSSI measurement may provide reliable signal strength data that may range typically from −30 dBm for strong signals to −90 dBm for weak signals at sensitivity threshold of the receiver.

In accordance with an embodiment, the first repeater device 106A may be configured to measure the signal-to-noise ratio (SNR) of the first synchronization pattern (e.g., the synchronization pattern 308B) within the received first extended WLAN beacon (e.g., the extended WLAN beacon 322). The first repeater device 106A may isolate the first synchronization pattern (e.g., the synchronization pattern 308B) components from frame of the first extended WLAN beacon (e.g., the extended WLAN beacon 322). To isolate the first synchronization pattern, the first repeater device 106A is configured to measure average power of pattern signal during active transmission periods and concurrently measure noise power during quiet intervals or using spectral analysis operations. The measurement may facilitate determination of background noise characteristics within the same frequency band. During the SNR determination operation, the first repeater device 106A may perform Fast Fourier Transform (FFT) analysis or correlation-based signal processing. The FFT analysis or the correlation-based signal processing may separate coherent synchronization pattern energy from random noise components. The separation may enable accurate determination of signal quality that may typically range from 0 dB for barely detectable signals to 40 dB or higher for high-quality reception conditions.

In accordance with an embodiment, the first repeater device 106A may be further configured to compare the first synchronization pattern (e.g., the synchronization pattern 308B) in the received first extended WLAN beacon (e.g., the extended WLAN beacon 322) with the prestored synchronization pattern 206A in the first repeater device 106A. The prestored synchronization pattern 206A may refer to a defined reference timing sequence that may be previously loaded into the first repeater device 106A during initialization and configuration phase, serving as a baseline timing template against which all received synchronization patterns may be evaluated for timing alignment purposes.

In accordance with an embodiment, the first repeater device 106A may compare the first synchronization pattern (e.g., the synchronization pattern 308B) with the prestored synchronization pattern 206A through cross-correlation analysis where the first repeater device 106A may perform sliding correlation between the received synchronization pattern and the prestored synchronization pattern 206A across multiple time offsets ranging from −500 to +500 nanoseconds in 10-nanosecond increments. The correlation coefficient calculation may use normalized cross-correlation operation where correlation values may range from 0.0 for no match to 1.0 for perfect match, with pattern matching threshold typically set at 0.85 for reliable synchronization detection. For example, if the prestored synchronization pattern 206A contains the 16-bit sequence "1011010010101101" and the first repeater device 106A receives a synchronization pattern "0110100101011010" due to timing misalignment, the correlation analysis may slide the received pattern across different time positions to find the optimal match. At time offset zero, the bit-by-bit comparison may show "1011010010101101" versus "0110100101011010" resulting in 6 matching bits out of 16 total bits, yielding a correlation coefficient of 0.375. At time offset of one bit position, the comparison may become "1011010010101101" versus "1101001010110100" showing 10 matching bits and correlation coefficient of 0.625. At time offset of two-bit positions, the comparison may show "1011010010101101" versus "1010010101101001" with 12 matching bits and correlation coefficient of 0.75. The pattern matching operation may continue sliding the received pattern until time offset of three-bit positions where "1011010010101101" matches "0100101011010011" with 14 matching bits, achieving correlation coefficient of 0.875 which exceeds the threshold of 0.85 for successful pattern lock. The correlation coefficient calculation may use normalized cross-correlation algorithms where correlation values may range from 0.0 for no match to 1.0 for perfect match, with pattern matching threshold typically set at 0.85 for reliable synchronization detection. The comparison process may include signal preprocessing operations such as noise filtering using digital filtering techniques, signal normalization to account for varying received signal amplitudes, and bit-level comparison for digital pattern sequences where individual bit mismatches may be counted and compared against maximum allowable error thresholds of 2-5% depending on signal quality conditions. The pattern matching operation may implement adaptive thresholds where strong signal conditions with RSSI greater than −50 dBm may require correlation coefficients above 0.90 for pattern lock, while marginal signal conditions with RSSI between −65 to −75 dBm may accept correlation coefficients above 0.75 to accommodate noise effects while maintaining synchronization reliability.

In accordance with an embodiment, the first repeater device 106A may count consecutive mismatches between the received first synchronization pattern (e.g., the synchronization pattern 308B) and the prestored synchronization pattern 206A. The consecutive mismatch counting operation may include pattern correlation analysis for each received first synchronization pattern (e.g., the synchronization pattern 308B). Further, the consecutive mismatch counting operation may include comparison of correlation coefficient results against a defined matching threshold. The defined matching threshold may range from 0.7 to 0.9 depending on signal quality requirements and incrementing mismatch counter when correlation values may fall below threshold indicating unsuccessful pattern alignment. The consecutive mismatch counting operation may incorporate reset logic where consecutive mismatch counter may be cleared to zero whenever a successful pattern match may be achieved. The reset logic may ensure that only consecutive failures may be tracked and isolated pattern matching errors may not accumulate inappropriately. The consecutive mismatch counting operation may provide feedback for iterative timing adjustment operation. Higher mismatch counts may indicate that timing of the local oscillator 226 may be significantly offset from defined synchronization point and may require larger timing corrections. Lower mismatch counts may suggest that timing may be approaching correct alignment and may require smaller, more precise adjustments to achieve stable pattern matching and synchronization lock.

In accordance with an embodiment, the first repeater device 106A may be further configured to determine delay adjustment values for the local oscillator based on measured signal strength, measured signal-to-noise ratio, and counted consecutive mismatches. The multi-parameter delay adjustment approach may include accelerated synchronization convergence through adaptive step sizing. The adaptive step sizing may apply larger corrections under strong signal conditions and conservative adjustments under marginal signal conditions. The adaptive step sizing may enhance timing precision by incorporating signal quality assessment into adjustment calculations that may prevent overshooting and oscillation effects.

In accordance with an embodiment, the first repeater device 106A may be configured to calculate time differences between the embedded timestamps and local clock values of the local oscillator 226 for a direct delay adjustment. In some embodiments, the first repeater device 106A may be configured to extract the embedded timestamps from a received first synchronization pattern (e.g., the synchronization pattern 308B) within the first extended WLAN beacon. Then, the first repeater device 106A may be configured to read current local clock values from the local oscillator 226 at a time of timestamp extraction. Further, the first repeater device 106A may be configured to perform a difference operation between the embedded timestamps and the local clock values of the local oscillator 226. For example, the first repeater device 106A may calculate a time difference by subtracting an embedded timestamp value of 1000 nanoseconds from a local clock value of 1050 nanoseconds to determine a 50-nanosecond timing offset. The calculated time differences may provide direct delay adjustment values for synchronizing the local oscillator 226 without requiring iterative pattern matching processes.

In accordance with an embodiment, the first repeater device 106A may be further configured to iteratively adjust the timing of the local oscillator 226 based on the signal strength measurement or the SNR measurement at the first repeater device 106A, until the first synchronization pattern (e.g., the synchronization pattern 308B) matches with the prestored synchronization pattern. During iteration, the first repeater device 106A may measure the signal strength of the received first extended WLAN beacon (e.g., the extended WLAN beacon 322) using the RSSI measurements. The first repeater device 106A may further determine the SNR measurement of the first synchronization pattern (e.g., the synchronization pattern 308B) to assess quality and reliability of received timing information. The first repeater device 106A may initially perform a coarse timing adjustment when the RSSI measurements may indicate strong signal reception. The course timing adjustment may apply larger timing corrections to local oscillator delay settings to rapidly approach synchronization point. The first repeater device 106A may implement fine timing adjustments with comparatively smaller incremental changes as compared to the coarse timing adjustment when the signal strength may be weaker or when correlation between received and prestored patterns may approach target threshold. In some examples, the first repeater device 106A may receive the first synchronization pattern (e.g., the synchronization pattern 308B) with an RSSI of −40 dBm indicating strong signal strength and an SNR of 25 dB suggesting high signal quality. In such examples, the first repeater device 106A may apply a timing adjustment of 100 nanoseconds to local oscillator edge delay. Conversely, in some examples, subsequent measurements may show an RSSI of −70 dBm with an SNR of 10 dB indicating marginal signal conditions. In such examples, timing information may be less reliable due to noise effects or interference. In such a case, the first repeater device 106A may reduce a timing adjustment increment to about 10 nanoseconds (or a specific time interval). The reduction may implement fine-grain timing corrections. The fine-grain timing corrections may avoid overshooting timing alignment and may ensure stable convergence to synchronized state without introducing timing oscillations or instability.

In accordance with an embodiment, the first repeater device 106A may be further configured to iteratively adjust the timing of the local oscillator 226 by adaptive step size control. In an embodiment, in the adaptive step size control, a higher strength signal condition may enable the first repeater device 106A to implement timing corrections in range of 50-200 nanoseconds per iteration cycle. As an example, the higher strength signal condition may refer to a condition in which the RSSI measurements are above 50 dBm and the SNR measurements exceed 20 dB. The adaptive step size control may facilitate rapid convergence to target synchronization point when signal quality may provide confidence in accuracy of timing measurements. For intermediate signal conditions with the RSSI measurements between −50 dBm and −65 dBm and the SNR measurements in 15-20 dB range, the first repeater device 106A may apply moderate timing adjustments of 25-75 nanoseconds per iteration to balance convergence speed with timing precision. In some embodiments, for weak signal conditions, the first repeater device 106A may perform conservative timing adjustments of 5-25 nanoseconds per iteration to prevent timing errors caused by unreliable signal measurements. The weak signal conditions may refer to a condition in which the RSSI measurement is below-65 dBm and the SNR measurement is less than 15 dB.

In accordance with an embodiment, the first repeater device 106A may be further configured to apply determined delay adjustment values to the local oscillator 226 to adjust the timing of the local oscillator 226 until the first synchronization pattern (e.g., the synchronization pattern 308B) matches the prestored synchronization pattern 206A. The application of the determined delay adjustment values may include guaranteed synchronization convergence through systematic timing refinement that may eliminate random adjustment attempts and reduce synchronization acquisition time. The application of the determined delay adjustment values may result in enhanced timing stability through calculated corrections, which in turn may prevent oscillation effects and maintain consistent local oscillator performance once synchronization lock may be achieved.

In accordance with an embodiment, the first repeater device 106A may be further configured to lock TDD signal timing at the first repeater device 106A based on the first synchronization pattern (e.g., the synchronization pattern 308B) that matches with the prestored synchronization pattern. In an embodiment, the first repeater device 106A may lock TDD signal timing through a stabilization operation. The stabilization operation may occur when the first synchronization pattern (e.g., the synchronization pattern 308B) achieves a successful correlation with the prestored synchronization pattern over a defined number of consecutive synchronization cycles. In an example, the successful correlation may require 3-5 successful pattern matches to ensure timing stability and prevent false lock conditions caused by temporary signal fluctuations or interference. The TDD signal timing lock operation may cause the first repeater device 106A to lock current local oscillator delay settings that may produce successful pattern alignment. The locking may cause the first repeater device 106A to transition from iterative adjustment mode to a stable timing reference mode where the local oscillator may generate consistent TDD control signals for analog switches based on locked timing parameters.

In accordance with an embodiment, the first repeater device 106A may be further configured to lock the local oscillator 226 timing at the first repeater device 106A to a last received synchronization pattern. In the timing lock operation, the first repeater device 106A may store timing parameters associated with the successfully matched synchronization pattern in persistent memory. After that, the first repeater device 106A may configure the local oscillator 226 to maintain established timing reference through internal clock stability operations. Later, the first repeater device 106A may implement timing hold-over capabilities that may preserve synchronization accuracy during periods when new synchronization patterns may not be received from upstream devices in the wireless mesh network. The timing lock operation may further include a drift compensation operation. In the drift compensation operation, the first repeater device 106A may monitor the local oscillator 226 stability and may apply correction factors based on known oscillator characteristics to prevent timing degradation over extended periods. The timing lock operation may ensure that locked timing reference remains sufficiently accurate to maintain TDD coordination with the plurality of repeater device 106 and the MAP device 104A until the next synchronization update may be received. The local oscillator timing lock may enable synchronization continuity that may maintain network coordination despite temporary communication interruptions. The local oscillator timing lock may ensure reduced dependency on continuous synchronization updates that may improve network efficiency and reduce traffic control overhead. The enhanced network resilience through distributed timing retention may enable each of the plurality of repeater devices 106 to maintain operational capability even when connectivity to the MAP device 104A may be temporarily compromised.

In accordance with an embodiment, the first repeater device 106A may be configured to monitor correlation between received and prestored synchronization patterns for a verification period. The correlation monitoring operation may confirm that achieved timing alignment may remain stable under varying signal conditions may only proceed with a final locked timing state when correlation coefficients may consistently exceed predetermined thresholds indicating a reliable synchronization. The TDD signal timing lock may include precise temporal coordination. The temporal coordination may ensure that the transmit-cycles and the receive-cycles of the first repeater device 106A may be aligned with timing of the MAP device 104A. In some embodiment, a timing drift may occur. The timing drift may be eliminated through a stabilization operation of the local oscillator 226. The stabilization operation of the local oscillator 226 may maintain synchronization accuracy over extended periods. The final locked timing state may enable the first repeater device 106A to transition from an alignment mode (or WLAN modem mode) to a repeater mode. In the final locked timing state, the first repeater device 106A may be configured to reliably forward synchronized signals while maintaining established timing reference. The forwarding of the synchronized signals may ensure that subsequent synchronization operations and data transmission activities may occur within precisely coordinated time slots, which in turn may optimize spectrum utilization and minimize inter-device interference across the wireless mesh network topology.

In accordance with an embodiment, the MAP device 104A may be further configured to determine a propagation delay compensation based on the FTM parameters. The MAP device 104A may determine propagation delay compensation by determination of one-way propagation delay as half of measured round-trip time. The MAP device 104A may analyze the FTM parameters received from the plurality of repeater devices 106 to determine signal propagation delays. The MAP device 104A processes timing measurement data within the FTM parameters using delay calculation algorithms. For example, the MAP device 104A may determine a propagation delay compensation of 25 nanoseconds by analyzing FTM parameters indicating a round-trip time measurement between the MAP device 104A and a target repeater device. The MAP device 104A may determine the propagation delay compensation by measuring time-of-flight differences extracted from the FTM parameters. The determined propagation delay compensation accounts for signal transmission delays across wireless links in a mesh network topology.

In accordance with an embodiment, the MAP device 104A may be further configured to apply the propagation delay compensation to transmission timing to transmit a subsequent extended WLAN beacon transmission to at least the first repeater device 106A. The MAP device 104A may adjust a transmission schedule by adding the determined propagation delay compensation to planned beacon transmission times. The MAP device 104A may modify internal timing circuits to account for calculated signal travel delays before initiating beacon transmission. For example, the MAP device 104A may apply a propagation delay compensation of 25 nanoseconds by advancing a transmission timing by 25 nanoseconds earlier than a scheduled transmission time to compensate for signal propagation delay to the first repeater device 106A. The MAP device 104A may use the adjusted transmission timing to synchronize transmission of subsequent extended WLAN beacon transmissions. The applied propagation delay compensation may ensure the subsequent extended WLAN beacon transmission arrives at the first repeater device 106A at precise timing intervals for accurate synchronization. The propagation delay compensation may be dynamically updated based on continuous FTM measurements, enabling the MAP device 104A to adapt to changes in propagation conditions and maintain precise timing synchronization across the wireless mesh network despite variations in signal travel times caused by environmental factors or network topology modifications.

In accordance with an embodiment, the first repeater device 106A may be further configured to adjust a TDD signal timing at the first repeater device 106A based on local propagation delay characteristics specific to a corresponding location of the first repeater device 106A in the wireless mesh network. The adjustment may include the measurement and compensation of the first repeater device 106A for unique environmental factors including distance-related propagation delays, multipath effects, atmospheric conditions, and physical obstructions, that may affect signal transmission timing at specific deployment location. The independent timing adaptation operation may operate through local Fine Timing Measurement (FTM) analysis.

The first repeater device 106A may determine round-trip propagation delays to neighboring network nodes, measure signal travel times across different communication paths, and determine location-specific timing corrections that may account for unique propagation environment at position within the wireless mesh network topology. The independent timing adaptation operation may include environmental sensing capabilities where the first repeater device 106A may monitor local interference patterns, atmospheric propagation effects, and signal reflection characteristics that may vary based on geographical location, building structures, terrain features, and weather conditions. Varying characteristics may enable the first repeater device 106A to apply customized timing adjustments that may optimize TDD performance for specific operational environment. The local adaptation operation may continuously or periodically refine timing parameters based on real-time measurements of signal quality, propagation characteristics, and communication performance with neighboring network nodes. The real-time measurement may ensure that TDD signal timing may remain adjusted for unique propagation conditions at the first repeater device 106A. The independent timing adaptation may enable location-optimized performance that may account for site-specific propagation characteristics, improved synchronization accuracy through customized timing corrections.

In accordance with an embodiment, the first repeater device 106A may be further configured to switch from the WLAN modem mode to a repeater mode at a time of forwarding of a second extended WLAN beacon to one or more neighboring repeater devices of the plurality of repeater devices 106. The repeater mode may be an operational state where an analog repeater device (e.g., the first repeater device 106A) may function as a signal relaying mesh node that receives wireless signals from an upstream network node and may amplify the received signals to compensate for transmission losses. Further, the analog repeater device (e.g., the first repeater device 106A) may retransmit the amplified signals to downstream network nodes to extend network coverage beyond the direct transmission range of the MAP device 104A. In the context of TDD synchronization operations, the repeater mode may enable the first repeater device 106A to forward extended WLAN beacons that may include synchronization patterns and TDD parameters to subsequent neighboring repeater devices in the predetermined sequential order while maintaining the locked TDD timing achieved during its own synchronization process. The forwarding may create a distributed synchronization chain that propagates precise timing coordination throughout the wireless mesh network. The distributed synchronization chain may enable scalable network expansion. During the scalable network expansion, each synchronized repeater device of the plurality of repeater device 106 may operate as both a timing-synchronized network node and a synchronization signal relay station for extending TDD coordination to other repeater devices of the plurality of repeater devices 106 beyond the direct range of the MAP device 104A. The repeater mode may provide improved synchronization resilience and redundant synchronization paths when primary communication links may fail. The repeater mode operation may further reduce network overhead through localized beacon forwarding between adjacent devices rather than centralized broadcast transmission to all network nodes concurrently.

In accordance with an embodiment, the first repeater device 106A may be further configured to forward a second extended WLAN beacon to the second repeater device 106B in the specific order based on the network topology mapping information for the TDD synchronization in the wireless mesh network. The forwarding operation may leverage established timing lock to maintain synchronization pattern integrity during retransmission. The first repeater device 106A may apply locked timing reference to generate outgoing extended WLAN beacon with precise temporal alignment that may preserve synchronization characteristics required for successful pattern matching at the second repeater device 106B. The forwarding of the second extended WLAN beacon may cascade synchronization propagation across the wireless mesh network without requiring direct communication between the MAP device 104A and the plurality of repeater devices 106. The synchronization propagation across the wireless mesh network may allow the scalable network expansion through the distributed synchronization chain or mesh network synchronization forwarding. The scalable network expansion may allow addition of new repeater devices beyond direct range of the MAP device 104A. Each synchronized repeater device may be capable of propagating timing information to subsequent devices even if direct connectivity to the MAP device 104A may be temporarily lost. The first repeater device 106A may transmit the second extended WLAN beacon with optimized power levels and signal quality parameters based on distance and propagation characteristics to the second repeater device 106B. The transmission of the second extended WLAN beacon with optimized power levels and signal quality parameters may ensure reliable beacon reception and successful synchronization pattern detection despite varying environmental conditions or interference across the wireless mesh network.

In accordance with an embodiment, the first repeater device 106A may execute a distributed multi-lock synchronization operation in which the first repeater device 106A of the plurality of repeater devices 106 may be configured to forward the last received synchronization pattern to one or more neighboring repeater devices of the plurality of repeater devices 106 to maintain a network-wide TDD synchronization. The distributed multi-lock operation may act as an independent phase-locked loop that may lock to received synchronization patterns. Concurrently, the received synchronization pattern may serve as a timing reference source for downstream devices in the wireless mesh network topology. The synchronized repeater devices from the plurality of repeater device 106 may then be able to propagate timing information to neighboring repeater devices of the plurality of repeater devices 106 that may not have direct connectivity to the MAP device 104A or previously synchronized devices. In the multi-lock synchronization operation, the first repeater device 106A may be configured to determine which neighboring devices may require synchronization based on network topology information. Further, the first repeater device 106A may be configured to select a defined transmission timing to avoid interference with ongoing TDD operations. Then, the first repeater device 106A may be configured to adapt forwarded synchronization pattern to account for local propagation characteristics and timing requirements of target receiving devices. The distributed multi-lock synchronization operation may generate redundant synchronization paths throughout the wireless mesh network. The redundant synchronization paths may enable multiple timing reference sources that may provide backup synchronization capabilities when primary communication links may fail or when network topology changes may require alternative synchronization routing paths. The distributed multi-lock synchronization operation may enable network-wide timing coordination, which may scale efficiently with mesh network size without increasing centralized control overhead.

In accordance with an embodiment, each repeater device of the plurality of repeater devices 106 may maintain independent timing locks while coordinating with neighboring devices through pattern forwarding operations that may create redundant synchronization paths throughout the wireless mesh network. The local propagation delay adaptation may include each repeater device measuring round-trip signal travel times to neighboring devices using local Fine Timing Measurement analysis and adjusting local TDD timing parameters to compensate for site-specific propagation characteristics including distance-related delays, multipath effects, and environmental factors specific to each repeater device location within the wireless mesh network topology. The distributed multi-lock synchronization operation may enable each repeater device to serve as both a timing reference receiver and a timing reference source, maintaining network-wide synchronization coordination even when primary communication links to the MAP device 104A may be temporarily compromised.

In accordance with an embodiment, the distributed multi-lock synchronization operation may apply to the plurality of repeater devices 106 that have achieved initial synchronization lock with the MAP device 104A or with previously synchronized repeater devices in the wireless mesh network. Each synchronized repeater device of the plurality of repeater devices 106 may maintain its locked timing reference while concurrently serving as a synchronization source for neighboring unsynchronized repeater devices. Serving as the synchronization source may generate a cascaded synchronization propagation throughout the wireless mesh network. The unsynchronized repeater devices from the plurality of repeater device 106 may receive synchronization patterns from synchronized neighboring devices and may follow the same pattern matching and timing adjustment procedures described herein until the unsynchronized repeater devices achieve synchronization lock and can participate in the distributed multi-lock synchronization operation.

In accordance with an embodiment, the first repeater device 106A may be further configured to calculate one or more modifications in TDD parameters of the received first extended WLAN beacon (e.g., the extended WLAN beacon 322) based on local performance measurements at the first repeater device 106A. The first repeater device 106A may monitor local signal quality metrics to determine when TDD parameter adjustments may improve local performance. The local signal quality metrics may include bit error rates, packet loss ratios, and timing jitter measurements. The one or more modifications in the TDD parameter may include adjustments to guard interval durations, uplink/downlink time slot allocations, or synchronization pattern update frequencies based on observed local propagation characteristics and interference conditions.

In accordance with an embodiment, the first repeater device 106A may be configured to communicate the one or more modifications in the TDD parameters to the MAP device 104A. The first repeater device 106A may communicate the one or more modifications in the TDD parameters through dedicated control messages transmitted during designated feedback intervals. The transmission of the dedicated control messages may enable the MAP device 104A to incorporate local performance data into network-wide TDD optimization operations. In some embodiments, the MAP device 104A may be configured to incorporate the one or more modifications into the first extended WLAN beacon for subsequent transmissions of one or more WLAN beacons. The MAP device 104A may be configured to incorporate the one or more modifications into the first extended WLAN beacon by updating the TDD parameter fields within the beacon structure, including modified uplink/downlink time slot allocations and adjusted synchronization timing values. The MAP device 104A may be configured to propagate the updated first extended WLAN beacon including the incorporated one or more modifications to the plurality of repeater devices 106 during subsequent transmissions of one or more WLAN beacons. The propagation of the updated first extended WLAN beacon including the incorporated one or more modifications may ensure that the plurality of repeater devices 106 in the wireless mesh network operates with the optimized TDD parameters that reflect both centralized intelligence and distributed feedback from local performance measurements.

In accordance with an embodiment, the MAP device 104A may be further configured to detect a beam routing change in the wireless mesh network. The beam routing change may occur due to a surrounding environmental change, such as moving obstacles between two repeater devices, or a change in a weather condition in case of outdoor deployment. The MAP device 104A may be configured to monitor the wireless mesh network and may detect changes in beam routing paths. The MAP device 104A may receive signal quality reports from the plurality of repeater devices 106. The signal quality reports may include the signal strength measurements, the signal-to-noise ratio values, and connection status information. The MAP device 104A may analyze the signal quality reports and may identify when routing paths need to change. The beam routing changes may occur when signal quality drops below acceptable levels between connected repeater devices. The physical obstacles may block signal paths between some repeater devices and may force routing modifications. Further, new repeater devices may join the wireless mesh network and may require routing updates to integrate the new repeater devices into the mesh topology. In some cases, the existing repeater devices may become unavailable due to power failure, hardware problems, or physical relocation of the existing repeater devices. Furthermore, environmental interference may degrade signal paths and may force routing changes throughout the wireless mesh network. The MAP device 104A may use threshold-based detection and may identify the routing changes. When signal strength falls below preset limits, the MAP device 104A may detect a routing change. Once the MAP device 104A detects a beam routing change, the MAP device 104A may update the network topology mapping information. The MAP device 104A may initiate new synchronization cycles for affected repeater devices. The synchronization process may ensure that the plurality of repeater devices 106 including newly joined remain properly synchronized after routing modifications. The MAP device 104A may repeat the sequential synchronization process for the new network configuration.

In accordance with an embodiment, the beam routing change detection process may be implemented through continuous monitoring operations where the MAP device 104A may periodically poll each repeater device at 5-second or other specified intervals to collect signal quality reports including signal strength indicator measurements, signal-to-noise ratio values, packet delivery ratios, and connection status indicators. The MAP device 104A may implement threshold-based analysis where RSSI degradation below-75 dBm may trigger routing change evaluation, SNR reduction below 15 dB may indicate potential path obstruction, and packet loss rates exceeding 5% may suggest communication link degradation requiring alternative routing paths. The detection may include comparative analysis where current signal measurements may be compared against historical baseline values collected over previous 24-hour periods. Trend analysis may be used to identify gradual signal degradation patterns that may predict imminent routing failures. The detection may include using connectivity matrix updates that may track line-of-sight relationships between the plurality of repeater devices 106 based on successful communication attempts. When routing changes may be detected, the MAP device 104A may calculate alternative communication paths using a combination of the shortest path, minimum interference, high-throughput paths to determine optimal sequential transmission order for maintaining network-wide synchronization coordination.

In accordance with an embodiment, the MAP device 104A may be further configured to initiate one or more synchronization cycles for one or more affected repeater devices of the plurality of repeater devices 106 based on the detection of the beam routing change. In an implementation, the targeted synchronization cycle may minimize network disruption through selective resynchronization of only affected devices rather than complete network-wide synchronization, reduced synchronization overhead by limiting timing adjustments to specific network segments impacted by routing changes, enhanced convergence speed through priority-based sequencing that may restore critical communication paths first, and improved network stability through rapid timing realignment that may prevent cascading synchronization failures based on beam routing modifications that may alter propagation delays or connectivity relationships between repeater devices in the wireless mesh network topology.

In accordance with an embodiment, the MAP device 104A may be further configured to periodically generate one or more extended WLAN beacons subsequent to the extended WLAN beacon. Further, the MAP device 104A may be configured to transmit the one or more extended WLAN beacons at a first frequency band. The periodic beacon transmission may provide sustained synchronization accuracy through regular timing reference updates that may prevent oscillator drift accumulation across network devices. The periodic transmission may provide proactive synchronization maintenance that may correct minor timing deviations before timing deviations compromise TDD coordination. The periodic transmission may provide enhanced network stability through continuous monitoring and correction of synchronization parameters that may maintain network performance. The periodic transmission may provide improved resilience against environmental interference or temporary signal disruptions that may otherwise cause synchronization loss without regular beacon updates to restore timing alignment across the wireless mesh network deployment.

Figure 4A:
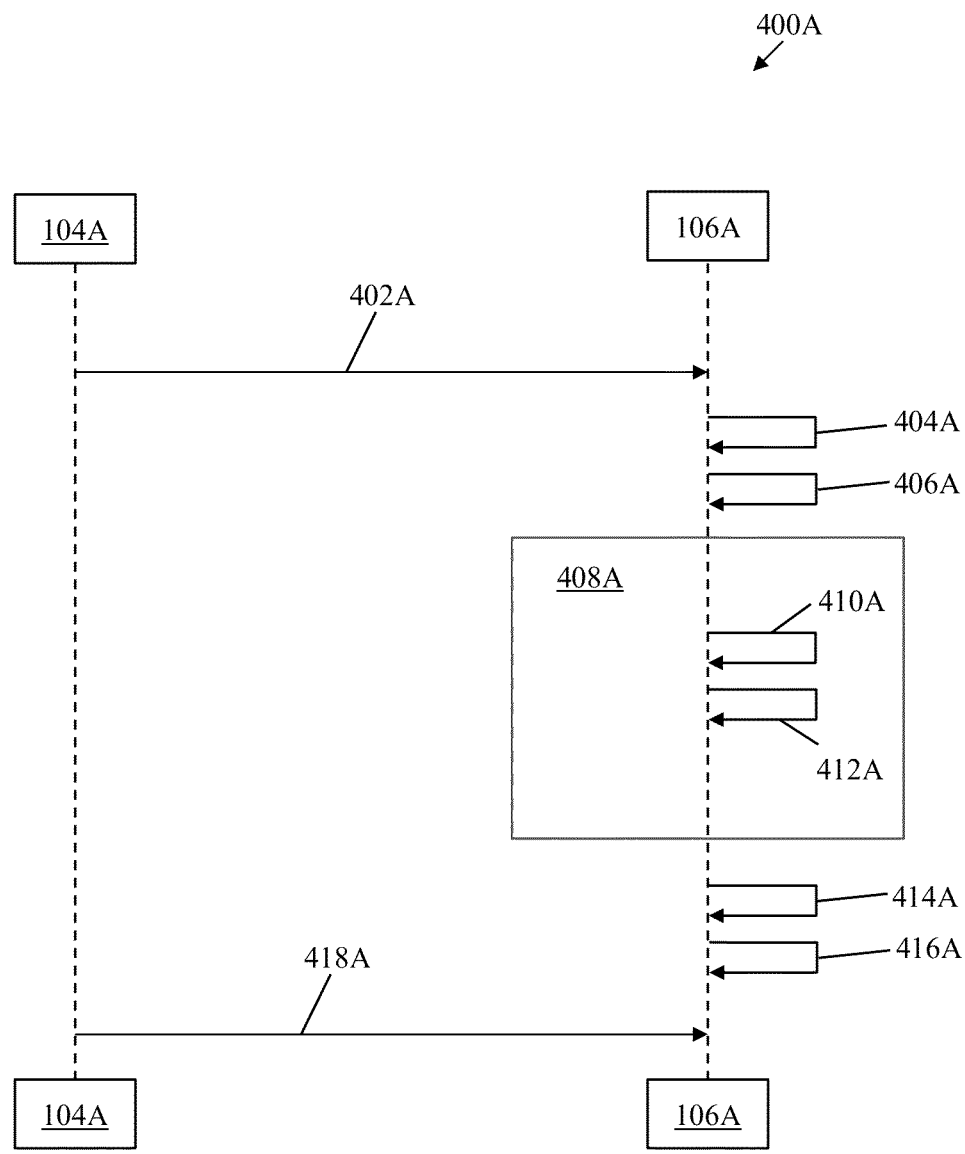
FIG. 4A is a diagram that illustrates an exemplary scenario for implementation of a system for TDD synchronization in a wireless mesh network, in accordance with an exemplary embodiment of the disclosure.

FIG. 4A is a diagram that illustrates an exemplary scenario for implementation of a system for time division duplexing (TDD) synchronization in a wireless mesh network, in accordance with an exemplary embodiment of the disclosure. FIG. 4A is explained in conjunction with elements from FIGS. 1, 2, and 3. With reference to FIG. 4A, there is shown an exemplary scenario 400A that depicts certain TDD synchronization operations between the MAP device 104A and the first repeater device 106A. In operation, the MAP device 104A may propagate the first extended WLAN beacon (e.g., the extended WLAN beacon 322) to the first repeater device 106A in the prestored order based on the network topology mapping information.

At operation 402A, the MAP device 104A may be configured to communicate (or broadcast) the first extended WLAN beacon (e.g., the extended WLAN beacon 322) that includes the first synchronization pattern (e.g., the synchronization pattern 308B) and the unique identifier of the first repeater device 106A. At 404A, the first repeater device 106A may receive the first extended WLAN beacon (e.g., the extended WLAN beacon 322). At 406A, the first repeater device 106A may compare the first synchronization pattern (e.g., the synchronization pattern 308B) with the prestored synchronization pattern 206A. The first repeater device 106A may enter an iterative loop 408A that includes operations 410A and 412A.

At operation 410A, the first repeater device 106A may be configured to adjust TDD signal delay based on signal strength measurements or signal-to-noise ratio measurements. At operation 412A, the first repeater device 106A may check for pattern match between the received first synchronization pattern (e.g., the synchronization pattern 308B) and the prestored synchronization pattern 206A. The iterative loop 408A may continue until a match is found between the first synchronization pattern (e.g., the synchronization pattern 308B) (or new synchronization pattern received from the MAP device 104A) and the prestored synchronization pattern 206A.

At operation 414A, the first repeater device 106A may lock TDD signal timing based on the first synchronization pattern (e.g., the synchronization pattern 308B) that matches the prestored synchronization pattern 206A. At operation 416A, the first repeater device 106A may switch to the repeater mode from the WLAN model mode after achieving synchronization lock.

At operation 418A, the MAP device 104A may communicate another extended WLAN beacon to the first repeater device 106A and the synchronization cycle may continue with periodic beacon transmissions to maintain network synchronization.

Figure 4B:
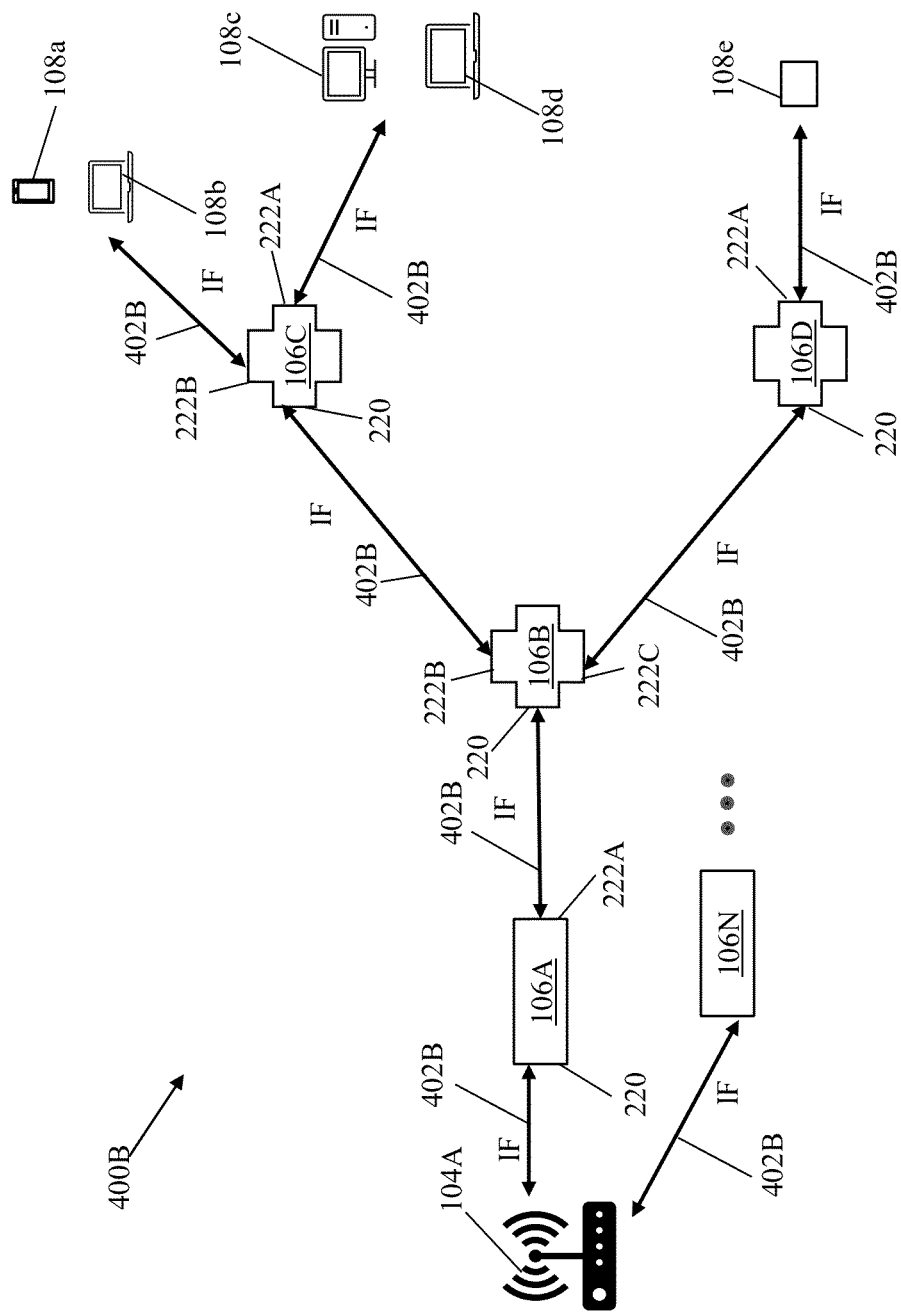
FIG. 4B is a diagram that illustrates an exemplary scenario for implementation of a system for TDD synchronization in a wireless mesh network, in accordance with another exemplary embodiment of the disclosure.

FIG. 4B is a diagram that illustrates another exemplary scenario for implementation of a system for time division duplexing (TDD) synchronization in a wireless mesh network, in accordance with an exemplary embodiment of the disclosure. FIG. 4B is explained in conjunction with elements from FIGS. 1, 2, 3, and 4A. With reference to FIG. 4B, there is shown an exemplary scenario 400B that depicts how synchronized repeater devices forward extended WLAN beacons to neighboring second repeater devices in the wireless mesh network through intermediate frequency (IF) links 402B. After achieving synchronization lock as described in FIG. 4A, the first repeater device 106A may forward a second extended WLAN beacon to the second repeater device 106B and the second repeater device 106B may further forward to one or more other repeater devices, such as the third repeater device 106C and the fourth repeater device 106D in the specific order based on the network topology mapping information. The synchronized repeater devices may operate in repeater mode to forward synchronization patterns to subsequent repeater devices until all repeater devices in the wireless mesh network achieve precise TDD synchronization at less than or equal to a microsecond level. The wireless mesh network topology may be determined based on the line-of-sight connectivity among the plurality of repeater devices 106 and position information of the plurality of repeater devices 106.

In accordance with an embodiment, the synchronized repeater devices may forward the extended WLAN beacons through intermediate frequency (IF) links 402B that may operate as analog signal pathways carrying the extended WLAN beacons between synchronized repeater devices. The synchronized repeater devices may transition from WLAN modem mode to the repeater mode after achieving timing lock. The forwarded extended WLAN beacons may maintain the original synchronization pattern and TDD parameters while being amplified through the set of amplifiers 210 and retransmitted via the RF switch circuit 212 and service phased antenna arrays 222A-222C at each repeater device of the plurality of repeater devices 106. The predetermined sequential order follows the network topology mapping maintained by the MAP device 104A, and the line-of-sight connectivity determination uses the set of onboard sensors 202 to measure signal quality and position information to establish optimal signal paths between consecutive repeater devices in the wireless mesh network.

In accordance with an embodiment, the extended WLAN beacons may include unique identifiers of target repeater devices, and the controller 204 in each repeater device may parse incoming extended WLAN beacons received through the donor antenna 220 to determine if the repeater device is the intended recipient based on the embedded target identifier until all repeater devices in the wireless mesh network achieve precise TDD synchronization.

In accordance with an embodiment, it is observed that the enhanced TDD synchronization delivers measurable performance improvements including increased network throughput, for example, in multigigabits. For example, the throughput of the UEs 108a, 108b, 108c, 108d, and 108e, served by the repeater devices (e.g., the third repeater device 106C and the fourth repeater device 106D) may be significantly improved. The performance improvements including increased network throughput may be a 30-75% improvement through dynamic uplink and downlink ratio adjustments, reduced packet latency from 15 milliseconds to under 3 milliseconds achieving an 80% latency reduction. The enhanced TDD synchronization enables sub-microsecond timing synchronization that eliminates interference and collision overhead. The disclosed system, such as the system 100, improves energy efficiency, demonstrating about 40% reduction in power consumption from 25 watts per repeater device through intelligent duty cycling and optimized transmission scheduling. Furthermore, enhanced spectral efficiency representing a 60% improvement in bandwidth utilization through coordinated channel access and elimination of contention-based delays may be achieved. The TDD synchronization accuracy may be achieved within 100 nanoseconds compared to previous methods requiring >10 microseconds tolerance. The TDD synchronization in the present disclosure enables network scalability supporting up to 50-1000 repeater devices while maintaining performance metrics within 5% of optimal values. The TDD synchronization in the present disclosure may ensure resource allocation variance of less than 10% across all network nodes as compared to 40% variance in unsynchronized networks. The system 100 demonstrates network resilience with recovery times under 200 milliseconds following topology changes or synchronization disruptions, making the system 100 suitable for applications requiring high-performance wireless mesh connectivity including industrial automation, smart city infrastructure, and high-density communication environments.

Figure 5:
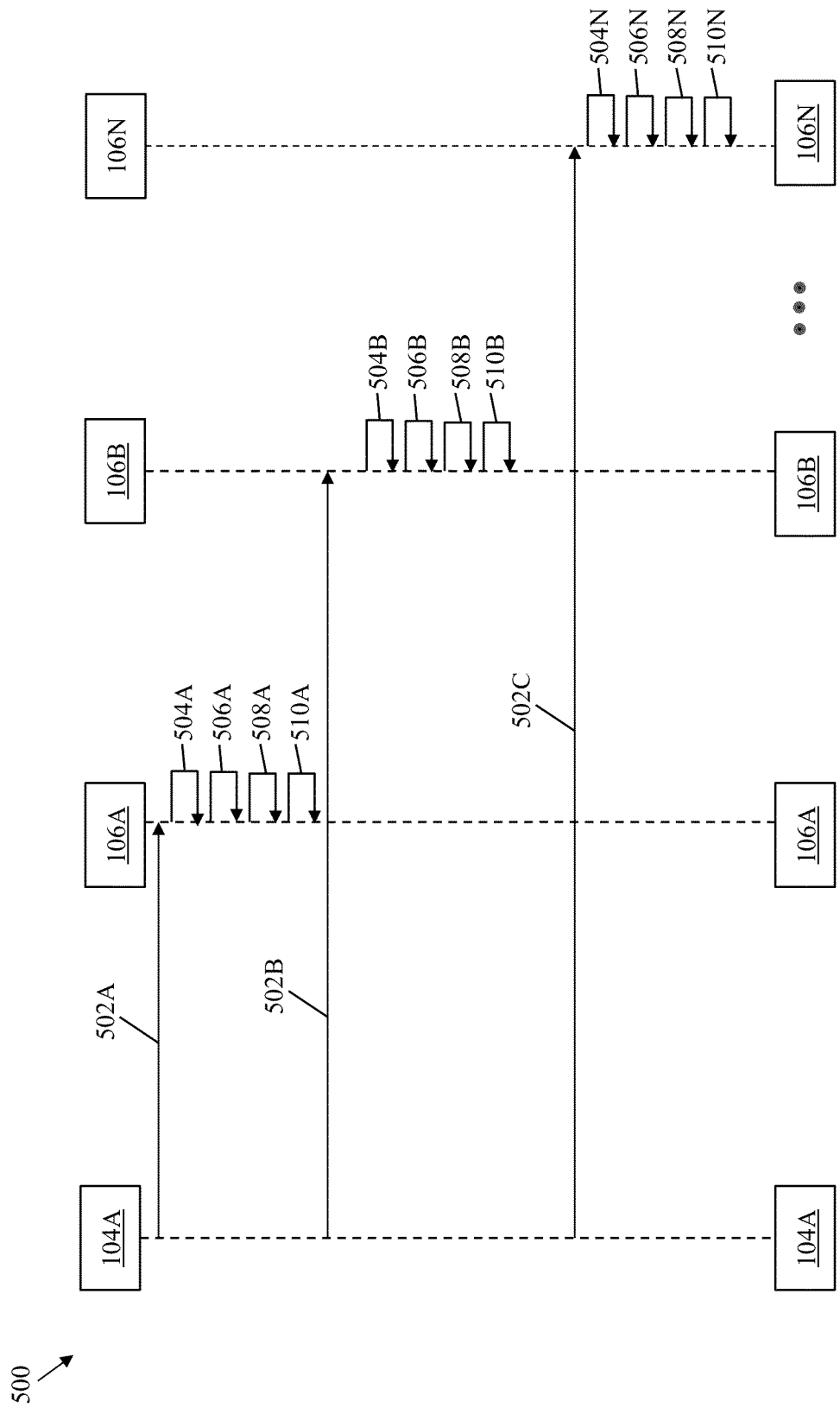
FIG. 5 is a diagram that illustrates an exemplary scenario for implementation of a system for TDD synchronization in a wireless mesh network, in accordance with yet another exemplary embodiment of the disclosure.
Figure 6A:
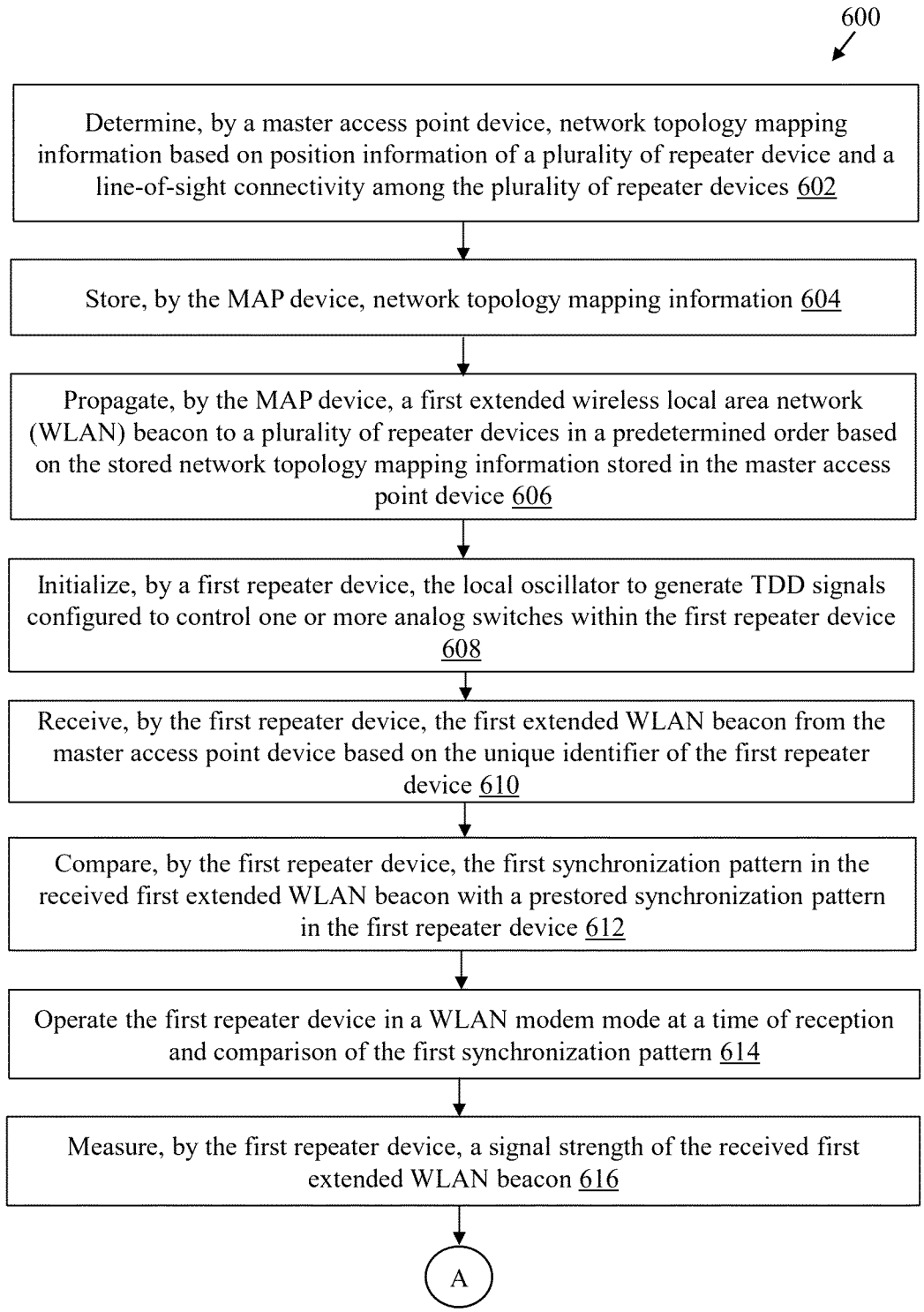
FIGS. 6A, 6B, 6C, and 6D are diagrams that collectively illustrate a flowchart of a method for TDD synchronization in a wireless mesh network, in accordance with an embodiment of the disclosure.
Figure 6B:
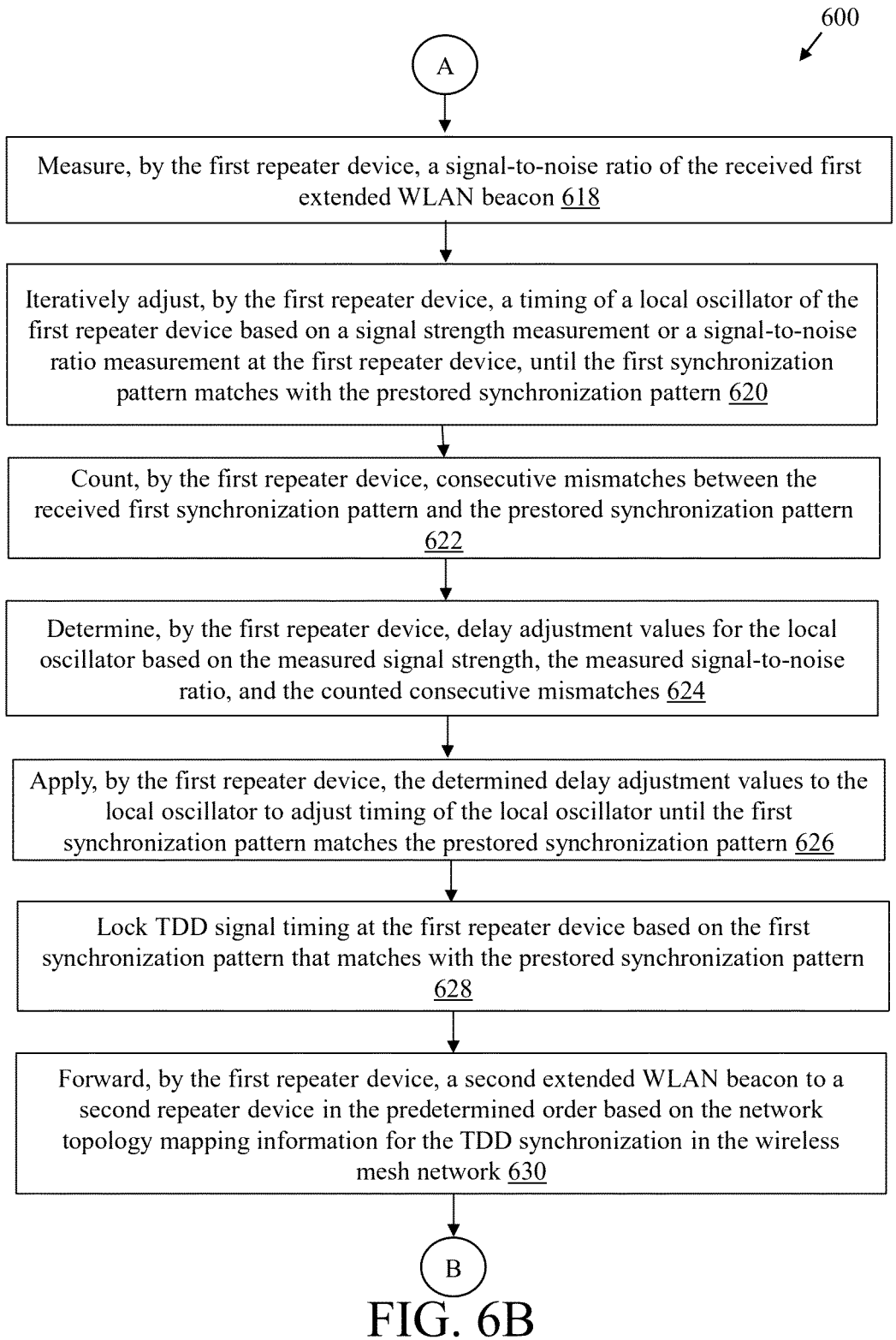
Figure 6C:
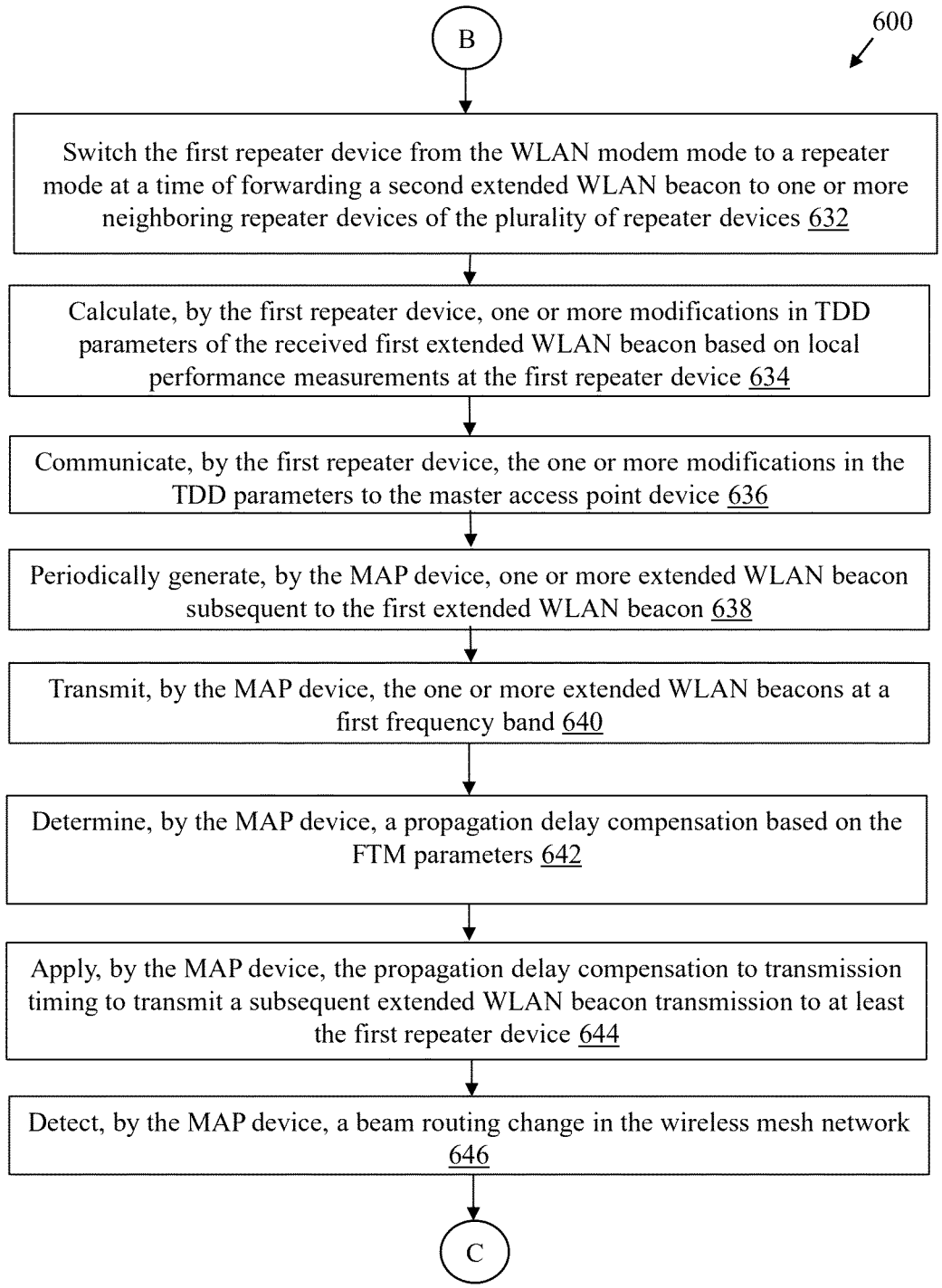
Figure 6D:
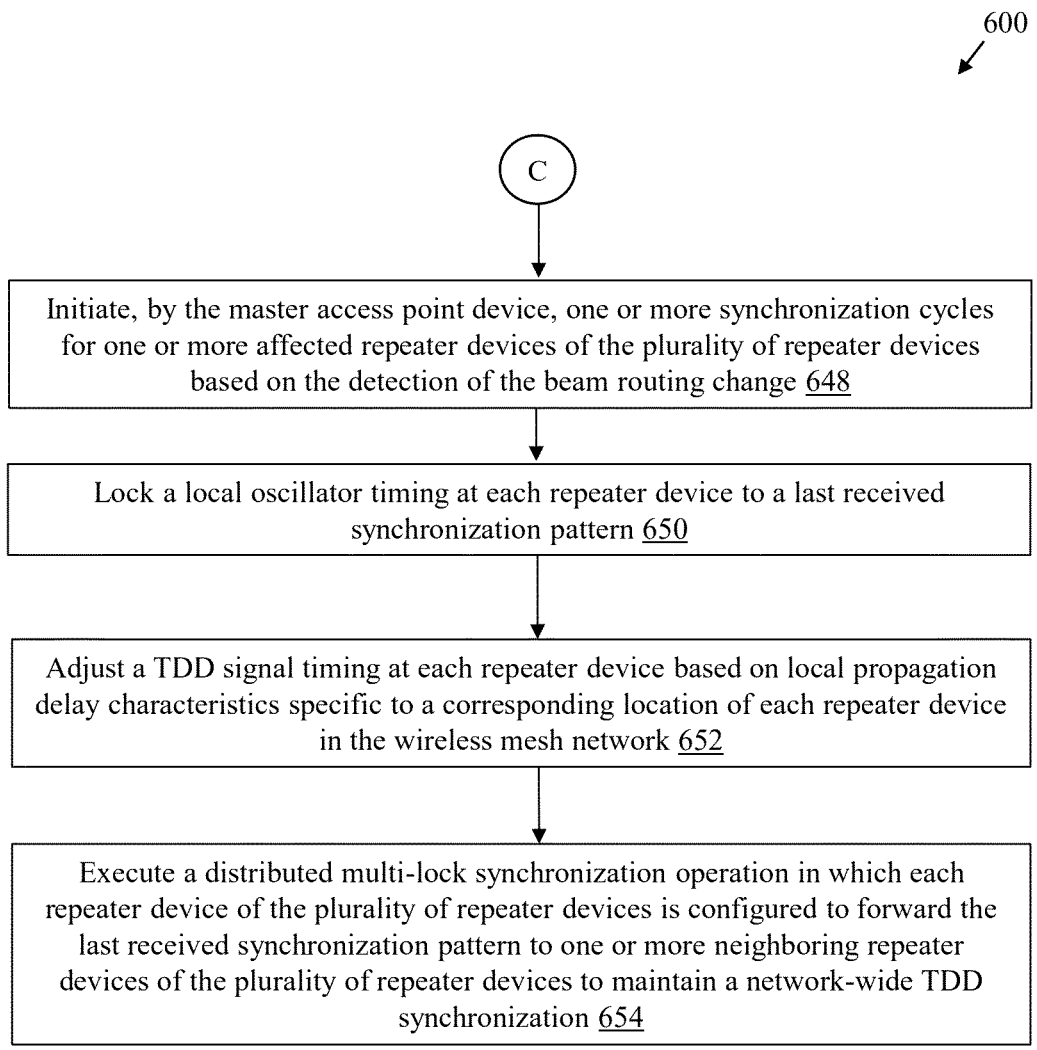

FIG. 5 is a diagram that illustrates another exemplary scenario for implementation of a system for precise time division duplexing (TDD) synchronization in a wireless mesh network, in accordance with another exemplary embodiment of the disclosure. FIG. 5 is explained in conjunction with elements from FIGS. 1, 2, 3, 4A, and 4B. With reference to FIG. 5, there is shown an exemplary sequence diagram 500 that depicts multi-root TDD synchronization operations where the MAP device 104A may concurrently communicate extended WLAN beacons to some repeater devices of the plurality of repeater devices 106.

At operations 502A, 502B, and 502C, the MAP device 104A may transmit the extended WLAN beacons to multiple repeater devices, such as the first repeater device 106A, the second repeater device 06B, and the Nth repeater device 106N. The repeater devices, such as the first repeater device 106A, the second repeater device 06B, and the Nth repeater device 106N, may receive the extended WLAN beacons that may include synchronization patterns and unique identifiers specific to the respective repeater devices.

At operations 504A, 506A, 508A, and 510A, the first repeater device 106A may perform pattern comparison, iterative timing adjustment, TDD signal locking, and transition to repeater mode, respectively. Similarly, at operations 504B, 506B, 508B, and 510B, the second repeater device 106B may perform the same synchronization operations as the first repeater device 106A independently. Similarly, at operations 504N, 506N, 508N, and 510N, the Nth repeater device 106N may perform the same synchronization operations as the first repeater device 106A independently. After operations 510A, 510B, and up to 510N are completed, the synchronized repeater devices such as the first repeater device 106A, the second repeater device 06B, and the Nth repeater device 106N, may then forward another extended WLAN beacons to one or more other neighboring repeater devices of the plurality of repeater devices 106 in the specific order in the wireless mesh network. The multi-root approach (i.e., multiple repeater devices receiving the extended WLAN beacon directly from MAP device 104A) may accelerate distributed synchronization across multiple network branches for large networks, improving network scalability and fault tolerance. Each synchronized repeater device may execute distributed multi-lock synchronization operations by forwarding received synchronization patterns to neighboring repeater devices to maintain network-wide TDD synchronization.

FIGS. 6A, 6B, 6C, and 6D are diagrams that collectively illustrate a flowchart of a method for time division duplexing (TDD) synchronization in a wireless mesh network for enhanced mesh network coordination and performance, in accordance with an embodiment of the disclosure. FIGS. 6A, 6B, 6C, and 6D are explained in conjunction with elements from FIGS. 1, 2, 3, 4A, 4B, and 5. With reference to 6A, 6B, 6C, and 6D, there is shown a flowchart of a method 600 that includes exemplary operations 602 through 650. The method 600 may be implemented in the system 100, for example, the MAP device 104A and the plurality of repeater devices 106.

At 602, network topology mapping information may be determined by the MAP device 104A, based on position information of the plurality of repeater device 106 and a line-of-sight connectivity among the plurality of repeater devices 106.

At 604, the network topology mapping information may be stored by the MAP device 104A.

At 606, the first extended WLAN beacon (e.g., the extended WLAN beacon 322) may be propagated by the MAP device 104A to the plurality of repeater devices 106 in a specific order based on the network topology mapping information stored in the MAP device 104A. The first extended WLAN beacon (e.g., the extended WLAN beacon 322) may include at least the first synchronization pattern (e.g., the synchronization pattern 308B) and the unique identifier of the first repeater device 106A of the plurality of repeater devices 106.

At 608, the local oscillator may be initialized by the first repeater device 106A to generate TDD signals configured to control one or more analog switches within the first repeater device 106A.

At 610, the first extended WLAN beacon (e.g., the extended WLAN beacon 322) may be received by the first repeater device 106A from the MAP device 104A.

At 612, the first synchronization pattern (e.g., the synchronization pattern 308B) in the received first extended WLAN beacon (e.g., the extended WLAN beacon 322) may be compared by the first repeater device 106A with the prestored synchronization pattern 206A in the first repeater device 106A.

At 614, the first repeater device 106A may be operated in the WLAN modem mode at a time of reception and comparison of the first synchronization pattern (e.g., the synchronization pattern 308B).

At 616, the signal strength of the received first extended WLAN beacon (or another RF data signal from the MAP device 104A) may be measured by the first repeater device 106A.

At 618, the signal-to-noise ratio of the received first extended WLAN beacon may be measured by the first repeater device 106A.

At 620, the timing of the local oscillator 226 of the first repeater device 106A may be iteratively adjusted by the first repeater device 106A based on the signal strength measurement or the signal-to-noise ratio measurement at the first repeater device 106A, until the first synchronization pattern (e.g., the synchronization pattern 308B) matches with the prestored synchronization pattern 206A.

At 622, consecutive mismatches between the received first synchronization pattern (e.g., the synchronization pattern 308B) and the prestored synchronization pattern 206A may be counted by the first repeater device 106A.

At 624, delay adjustment values for the local oscillator 226 may be determined by the first repeater device 106A based on the measured signal strength, the measured signal-to-noise ratio, and the counted consecutive mismatches.

At 626, the determined delay adjustment values may be applied to the local oscillator by the first repeater device 106A, to adjust the timing of the local oscillator 226 until the first synchronization pattern (e.g., the synchronization pattern 308B) matches the prestored synchronization pattern 206A.

At 628, the TDD signal timing may be locked at the first repeater device 106A based on the first synchronization pattern (e.g., the synchronization pattern 308B) that matches with the prestored synchronization pattern 206A.

At 630, the second extended WLAN beacon may be forwarded by the first repeater device 106A to the second repeater device 106B in the specific order based on the network topology mapping information for the TDD synchronization in the wireless mesh network.

At 632, the first repeater device 106A may be switched from the WLAN modem mode to a repeater mode at the time of forwarding of the second extended WLAN beacon to one or more neighboring repeater devices of the plurality of repeater devices 106.

At 634, the one or more modifications in TDD parameters of the received first extended WLAN beacon may be calculated by the first repeater device 106A based on local performance measurements at the first repeater device 106A.

At 636, the one or more modifications in the TDD parameters may be communicated to the MAP device 104A by the first repeater device 106A.

At 638, the one or more extended WLAN beacon subsequent to the first extended WLAN beacon may be periodically generated by the MAP device 104A.

At 640, the one or more extended WLAN beacon may be transmitted by the MAP device 104A at the first frequency band.

At 642, the propagation delay compensation may be determined by the MAP device 104A based on the Fine Timing Measurement (FTM) parameters. The first extended WLAN beacon (e.g., the extended WLAN beacon 322) may further include the FTM parameters.

At 644, the propagation delay compensation may be applied to transmission timing by the MAP device 104A to transmit a subsequent extended WLAN beacon transmission to at least the first repeater device 106A.

At 646, a beam routing change in the wireless mesh network may be detected by the MAP device 104A.

At 648, one or more synchronization cycles may be initiated by the MAP device 104A for one or more affected repeater devices of the plurality of repeater devices 106 based on detection of the beam routing change.

At 650, the local oscillator timing may be locked at each repeater device to the last received synchronization pattern (e.g., by each repeater device of the plurality of repeater devices 106).

At 652, the TDD signal timing may be adjusted at each repeater device based on local propagation delay characteristics specific to the corresponding location of each repeater device in the wireless mesh network.

At 654, the distributed multi-lock synchronization operation may be executed in which each repeater device of the plurality of repeater devices 106 may be configured to forward the last received synchronization pattern to one or more neighboring repeater devices to maintain the network-wide TDD synchronization.

Various embodiments of the disclosure may provide the system 100 (FIG. 1). The system 100 may further include the first repeater device 106A of the plurality of repeater devices 106. The system 100 may further include the MAP device 104A that may be configured to store the network topology mapping information. The MAP device 104A is further configured to propagate the first extended WLAN beacon (e.g., the extended WLAN beacon 322) to the plurality of repeater devices 106 in the specific order based on the stored network topology mapping information. The first extended WLAN beacon (e.g., the extended WLAN beacon 322) may include at least the first synchronization pattern (e.g., the synchronization pattern 308B) and the unique identifier of the first repeater device 106A of the plurality of repeater devices 106. The first repeater device 106A may include the local oscillator 226. The first repeater device 106A may be further configured to receive the first extended WLAN beacon (e.g., the extended WLAN beacon 322) from the MAP device 104A based on the unique identifier of the first repeater device 106A. The first repeater device 106A may be further configured to compare the first synchronization pattern (e.g., the synchronization pattern 308B) in the first extended WLAN beacon (e.g., the extended WLAN beacon 322) with the prestored synchronization pattern 206A in the first repeater device 106A. The first repeater device 106A may be further configured to iteratively adjust the timing of the local oscillator 226 based on the signal strength measurement or the signal-to-noise ratio measurement at the first repeater device 106A, until the first synchronization pattern (e.g., the synchronization pattern 308B) is matched with the prestored synchronization pattern. The first repeater device 106A may be further configured to lock the TDD signal timing at the first repeater device 106A when the first synchronization pattern (e.g., the synchronization pattern 308B) is matched with the prestored synchronization pattern.

Various embodiments of the disclosure may provide a computer program product for wireless communication, the computer program product comprising a computer-readable storage medium (e.g., a non-transitory computer-readable storage medium) having program instructions embodied therewith, the program instructions are executable by a system to cause the system to execute operations, the operation may include storing, by the MAP device 104A, the network topology mapping information. The operations may further include propagating, by the MAP device 104A, the first extended WLAN beacon (e.g., the extended WLAN beacon 322) to the plurality of repeater devices 106 in the specific order based on the network topology mapping information stored in the MAP device 104A. The first extended WLAN beacon (e.g., the extended WLAN beacon 322) may include at least the first synchronization pattern (e.g., the synchronization pattern 308B) and the unique identifier of the first repeater device 106A of the plurality of repeater devices 106. The operations may further include receiving, by the first repeater device 106A of the plurality of repeater devices 106, the first extended WLAN beacon (e.g., the extended WLAN beacon 322) from the MAP device 104A based on the unique identifier of the first repeater device 106A. The operations may further include comparing, by the first repeater device 106A, the first synchronization pattern (e.g., the synchronization pattern 308B) in the received first extended WLAN beacon (e.g., the extended WLAN beacon 322) with the prestored synchronization pattern 206A in the first repeater device 106A. The operations may further include iteratively adjusting, by the first repeater device 106A, the timing of the local oscillator 226 of the first repeater device 106A based on the signal strength measurement or the signal-to-noise ratio measurement at the first repeater device 106A, until the first synchronization pattern (e.g., the synchronization pattern 308B) matches with the prestored synchronization pattern. The operations may further include locking, by the first repeater device 106A, the TDD signal timing at the first repeater device 106A based on the first synchronization pattern (e.g., the synchronization pattern 308B) that matches with the prestored synchronization pattern 206A.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, software implementation can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but such movements does not render the storage device as transitory because the data is not transitory while it is stored.

What is claimed is:

1. A system for time division duplexing (TDD) synchronization in a wireless mesh network, the system comprising:
a first repeater device of a plurality of repeater devices; and
a master access point device configured to:
store network topology mapping information; and
propagate a first extended wireless local area network (WLAN) beacon to the plurality of repeater devices in a specific order based on the stored network topology mapping information,
wherein the first extended WLAN beacon comprises a first synchronization pattern and a unique identifier of the first repeater device,
and wherein the first repeater device comprises a local oscillator and is configured to:
receive the first extended WLAN beacon from the master access point device based on the unique identifier of the first repeater device;
compare the first synchronization pattern in the received first extended WLAN beacon with a prestored synchronization pattern in the first repeater device;
iteratively adjust a timing of the local oscillator based on a signal strength measurement or a signal-to-noise ratio measurement at the first repeater device, until the first synchronization pattern matches with the prestored synchronization pattern; and
lock TDD signal timing at the first repeater device based on the first synchronization pattern that matches with the prestored synchronization pattern.

2. The system of claim 1, wherein the first repeater device is further configured to forward a second extended WLAN beacon to a second repeater device of the plurality of repeater devices in the specific order based on the network topology mapping information for the TDD synchronization in the wireless mesh network.

3. The system of claim 1, wherein the master access point device is further configured to:
periodically generate one or more extended WLAN beacons subsequent to the first extended WLAN beacon;
transmit the one or more extended WLAN beacons at a first frequency band; and
determine the network topology mapping information and the specific order based on position information of the plurality of repeater devices and a line-of-sight connectivity among the plurality of repeater devices.

4. The system of claim 1, wherein the first repeater device is further configured to initialize the local oscillator to generate TDD signals.

5. The system of claim 1, wherein the first extended WLAN beacon further comprises Fine Timing Measurement (FTM) parameters, and wherein the master access point device is further configured to:
determine a propagation delay compensation based on the FTM parameters; and
apply the propagation delay compensation to transmission timing to transmit a subsequent extended WLAN beacon transmission after the first extended WLAN beacon to at least the first repeater device.

6. The system of claim 1, wherein the master access point device is further configured to:
generate traffic pattern forecasts based on historical network data to determine uplink duration and downlink duration ratios; and
generate a channel condition prediction for an upcoming time period based on a trend in signal quality measurements at the plurality of repeater devices to adjust TDD parameters in the first extended WLAN beacon.

7. The system of claim 1, wherein the first repeater device is further configured to:
calculate one or more modifications in TDD parameters of the received first extended WLAN beacon based on local performance measurements at the first repeater device; and
communicate the one or more modifications in the TDD parameters to the master access point device, wherein the master access point device is configured to incorporate the one or more modifications into the first extended WLAN beacon for subsequent transmissions of one or more extended WLAN beacons after the first extended WLAN beacon.

8. The system of claim 1, wherein the master access point device is further configured to:
detect a beam routing change in the wireless mesh network; and
initiate one or more synchronization cycles for one or more affected repeater devices of the plurality of repeater devices based on the detected beam routing change.

9. The system of claim 1, wherein each repeater device of the plurality of repeater devices is configured to execute a distributed multi-lock synchronization operation in which each repeater device of the plurality of repeater devices is configured to forward last received synchronization pattern to one or more neighboring repeater devices of the plurality of repeater devices to maintain a network-wide TDD synchronization.

10. The system of claim 1, wherein the master access point device is further configured to embed timestamps within the first synchronization pattern, wherein the first repeater device is configured to calculate time differences between the embedded timestamps and local clock values of the local oscillator for a direct delay adjustment.

11. The system of claim 1, wherein the first extended WLAN beacon further comprises:
a first type of encryption for a control plane communication,
a second type of encryption for a control message authentication, and
a third type of encryption for a beacon content protection.

12. The system of claim 1, wherein the first repeater device is further configured to:
measure a signal strength of the received first extended WLAN beacon;
measure a signal-to-noise ratio of the first synchronization pattern within the received first extended WLAN beacon; and
count consecutive mismatches between the first synchronization pattern and the prestored synchronization pattern.

13. The system of claim 12, wherein the first repeater device is further configured to:

determine delay adjustment values for the local oscillator based on the measured signal strength, the measured signal-to-noise ratio, and the counted consecutive mismatches; and apply the determined delay adjustment values to the local oscillator to adjust a timing of the local oscillator until the first synchronization pattern matches the prestored synchronization pattern.

14. The system of claim 1, wherein the first repeater device is further configured to:

operate in a WLAN modem mode at a time of reception and comparison of the first synchronization pattern; and switch from the WLAN modem mode to a repeater mode at a time of forwarding a second extended WLAN beacon to one or more neighboring repeater devices of the plurality of repeater devices.

15. A method for time division duplexing (TDD) synchronization in a wireless mesh network, the method comprising:

storing, by a master access point device, network topology mapping information;

propagating, by the master access point device, a first extended wireless local area network (WLAN) beacon to a plurality of repeater devices in a specific order based on the network topology mapping information stored in the master access point device, wherein the first extended WLAN beacon comprises a first synchronization pattern and a unique identifier of a first repeater device of the plurality of repeater devices;

receiving, by the first repeater device, the first extended WLAN beacon from the master access point device based on the unique identifier of the first repeater device;

comparing, by the first repeater device, the first synchronization pattern in the received first extended WLAN beacon with a prestored synchronization pattern in the first repeater device;

iteratively adjusting, by the first repeater device, a timing of a local oscillator of the first repeater device based on a signal strength measurement or a signal-to-noise ratio measurement at the first repeater device, until the first synchronization pattern matches with the prestored synchronization pattern;

locking, by the first repeater device, TDD signal timing at the first repeater device based on the first synchronization pattern that matches with the prestored synchronization pattern.

16. The method of claim 15, further comprising forwarding, by the first repeater device, a second extended WLAN beacon to a second repeater device in the specific order based on the network topology mapping information for the TDD synchronization in the wireless mesh network.

17. The method of claim 15, further comprising:

determining, by the master access point device, a propagation delay compensation based on Fine Timing Measurement (FTM) parameters, wherein the first extended WLAN beacon further comprises the FTM parameters; and applying, by the master access point device, the propagation delay compensation to transmission timing to transmit a subsequent extended WLAN beacon transmission after the first extended WLAN beacon to at least the first repeater device.

18. The method of claim 15, further comprising executing, by said each repeater device of the plurality of repeater devices, a distributed multi-lock synchronization operation in which said each repeater device is configured to forward the last received synchronization pattern to one or more neighboring repeater devices of the plurality of repeater devices to maintain a network-wide TDD synchronization.

19. The method of claim 15, further comprising:

embedding, by the master access point device, timestamps within the first synchronization pattern; and calculating, by the first repeater device, time differences between the embedded timestamps and local clock values of the local oscillator for a direct delay adjustment at the first repeater device.

20. A computer program product for time division duplexing (TDD) synchronization in a wireless mesh network, the computer program product comprising a non-transitory computer-readable storage medium having program instructions embodied therewith, the program instructions executable by a system to cause the system to execute operations, the operations comprising:

storing, by a master access point device, network topology mapping information;

propagating, by the master access point device, a first extended wireless local area network (WLAN) beacon to a plurality of repeater devices in a specific order based on the network topology mapping information stored in the master access point device, wherein the first extended WLAN beacon comprises a first synchronization pattern and a unique identifier of a first repeater device of the plurality of repeater devices;

receiving, by the first repeater device, the first extended WLAN beacon from the master access point device based on the unique identifier of the first repeater device;

comparing, by the first repeater device, the first synchronization pattern in the received first extended WLAN beacon with a prestored synchronization pattern in the first repeater device;

iteratively adjusting, by the first repeater device, timing of a local oscillator of the first repeater device based on a signal strength measurement or a signal-to-noise ratio measurement at the first repeater device, until the first synchronization pattern matches with the prestored synchronization pattern;

locking, by the first repeater device, TDD signal timing at the first repeater device based on the first synchronization pattern that matches with the prestored synchronization pattern.

* * * * *